(12) United States Patent
Oswald et al.

(10) Patent No.: US 11,980,907 B2
(45) Date of Patent: May 14, 2024

(54) ELECTROSTATIC SPRAYER

(71) Applicant: Climb Works LLC, Gatlinburg, TN (US)

(72) Inventors: Kolby Oswald, Hendersonville, TN (US); Nicholas Thompson, Gatlinburg, TN (US); Reid Bieber, Knoxville, TN (US); Brian Turley, Sevierville, TN (US); Peter Cochetas, Golden, CO (US)

(73) Assignee: CLIMB WORKS LLC, Gatlinburg, TN (US)

( * ) Notice: Subject to any disclaimer, the term of this patent is extended or adjusted under 35 U.S.C. 154(b) by 0 days.

(21) Appl. No.: 17/748,700

(22) Filed: May 19, 2022

(65) Prior Publication Data

US 2022/0371034 A1 Nov. 24, 2022

Related U.S. Application Data

(60) Provisional application No. 63/191,084, filed on May 20, 2021.

(51) Int. Cl.
*B05B 5/03* (2006.01)
*B05B 5/053* (2006.01)
(Continued)

(52) U.S. Cl.
CPC .............. *B05B 5/03* (2013.01); *B05B 5/0531* (2013.01); *B05B 5/0533* (2013.01); *B05B 5/16* (2013.01); *B05B 12/085* (2013.01)

(58) Field of Classification Search
CPC ....... B05B 5/03; B05B 5/0531; B05B 5/0533; B05B 5/16; B05B 5/085; B05B 5/043;
(Continued)

(56) References Cited

U.S. PATENT DOCUMENTS

| 4,004,733 A | 1/1977 | Law |
| 4,168,327 A | 9/1979 | Law |

(Continued)

OTHER PUBLICATIONS

International Search Report and Written Opinion for corresponding International Application No. PCT/US22/30098, dated Sep. 2, 2022; 15 pages.

*Primary Examiner* — Christopher R Dandridge
(74) *Attorney, Agent, or Firm* — HAYNES AND BOONE, LLP

(57) ABSTRACT

An electrostatic sprayer includes a spray gun having a nozzle at which pressurized spray media and pressurized air are combined into an atomized mixture. A generator electrostatically charges the atomized mixture at the nozzle. The generator may also electrostatically charge the pressurized spray media, or the pressurized air, or both at the nozzle. An input device of the spray gun is actuable by a user to vary a flow of the pressurized spray media to the nozzle. A main unit is connected to the spray gun with a hose via which the pressurized spray media and the pressurized air are communicated to the spray gun. The main unit has a first power mode in which a battery powers component(s) of the electrostatic sprayer. The main unit also has a second power mode in which a power source spaced apart from the main unit powers the component(s) of the electrostatic sprayer.

10 Claims, 35 Drawing Sheets

(51) Int. Cl.
 *B05B 5/16* (2006.01)
 *B05B 12/08* (2006.01)
(58) Field of Classification Search
 CPC ........... B05B 5/10; B05B 7/066; B05B 7/045; B05B 7/0815; B05B 7/0075; B05B 12/085
 See application file for complete search history.

(56) References Cited

U.S. PATENT DOCUMENTS

| | | | |
|---|---|---|---|
| 4,685,620 A | 8/1987 | Law et al. | |
| 4,765,539 A | 8/1988 | Noakes et al. | |
| 5,704,554 A | 1/1998 | Cooper et al. | |
| 5,765,761 A | 6/1998 | Aw et al. | |
| 7,004,407 B2 | 2/2006 | Cooper | |
| 7,297,211 B2 | 11/2007 | Cooper et al. | |
| 7,387,684 B2 | 6/2008 | Cooper et al. | |
| 7,462,242 B2 | 12/2008 | Cooper et al. | |
| 7,886,684 B2 | 2/2011 | Cooper et al. | |
| 7,913,938 B2 * | 3/2011 | Cooper | B05B 5/03 239/456 |
| 7,992,517 B2 | 8/2011 | Cooper et al. | |
| 8,486,030 B2 | 7/2013 | Thomason et al. | |
| 8,746,597 B2 | 6/2014 | Sides | |
| 8,784,390 B2 | 7/2014 | Thomason et al. | |
| 8,790,319 B2 | 7/2014 | Thomason et al. | |
| 9,138,760 B2 | 9/2015 | Cooper | |
| 9,144,811 B2 | 9/2015 | Cooper | |
| 9,278,367 B2 | 3/2016 | Cooper | |
| D770,015 S | 10/2016 | Wright | |
| 9,901,954 B2 | 2/2018 | Whiting et al. | |
| D818,701 S | 5/2018 | Wright | |
| 10,322,424 B2 | 6/2019 | Wright | |
| 10,434,525 B1 | 10/2019 | Cooper | |
| 10,464,084 B2 | 11/2019 | Nolte et al. | |
| 10,589,298 B2 | 3/2020 | Wright | |
| 10,654,068 B2 | 5/2020 | Whiting et al. | |
| 10,894,262 B1 * | 1/2021 | Cooper | B05B 5/1691 |
| 10,994,291 B2 | 5/2021 | Wright | |
| 2005/0139239 A1 | 6/2005 | Prae | |
| 2006/0118039 A1 | 6/2006 | Cooper | |
| 2006/0124779 A1 | 6/2006 | Cooper | |
| 2010/0266776 A1 | 10/2010 | Cooper et al. | |
| 2011/0133001 A1 | 6/2011 | Cooper et al. | |
| 2011/0202019 A1 | 8/2011 | Cooper et al. | |
| 2011/0259974 A1 | 10/2011 | Cooper et al. | |
| 2011/0284668 A1 | 11/2011 | Cooper et al. | |
| 2012/0056017 A1 | 3/2012 | Thomason et al. | |
| 2013/0020414 A1 | 1/2013 | Thomason et al. | |
| 2013/0341381 A1 | 12/2013 | Thomason et al. | |
| 2014/0077000 A1 | 3/2014 | Cooper et al. | |
| 2014/0079652 A1 | 3/2014 | Cooper et al. | |
| 2014/0110493 A1 | 4/2014 | Cooper | |
| 2015/0367365 A1 * | 12/2015 | Burks | B05B 9/0861 239/154 |
| 2017/0173607 A1 * | 6/2017 | Wright | B05B 5/0533 |
| 2019/0060922 A1 | 2/2019 | Wright | |
| 2019/0060924 A1 | 2/2019 | Whiting et al. | |
| 2019/0060938 A1 | 2/2019 | Whiting et al. | |
| 2019/0201927 A1 | 7/2019 | Sides | |
| 2019/0275543 A1 * | 9/2019 | Bolea | B05B 12/004 |
| 2020/0121867 A1 | 4/2020 | Wright | |
| 2020/0316625 A1 | 10/2020 | Jensen | |
| 2020/0360941 A1 | 11/2020 | Wright | |
| 2021/0069736 A1 | 3/2021 | Wright | |
| 2021/0146386 A1 | 5/2021 | Wright | |
| 2021/0252533 A1 | 8/2021 | Wright | |
| 2022/0134370 A1 | 5/2022 | Farnham, IV et al. | |

* cited by examiner

ELECTROSTATIC SPRAYER

CROSS-REFERENCE TO RELATED APPLICATION

This application claims the benefit of the filing date of, and priority to, U.S. Patent Application No. 63/191,084, filed May 20, 2021, the entire disclosure of which is hereby incorporated herein by reference.

BACKGROUND

The present application relates generally to sprayers and, more particularly, to an electrostatic sprayer with enhanced electrostatic charging features/components.

DETAILED DESCRIPTION

Figure 1A:
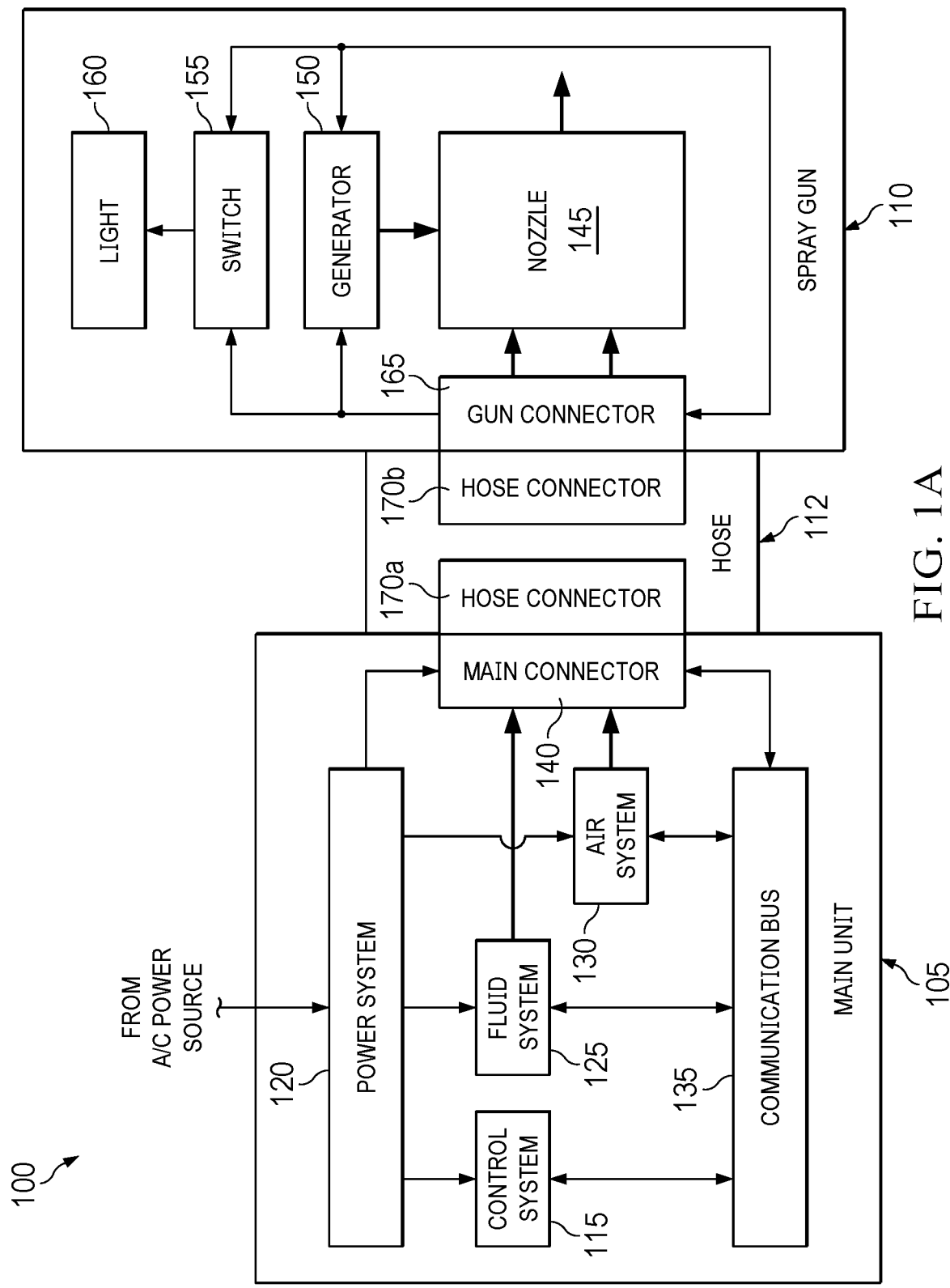
FIG. 1A is a diagrammatic illustration of an electrostatic sprayer, according to one or more embodiments.

Referring to FIGS. 1A through 1D, in an embodiment, an electrostatic sprayer is generally referred to by the reference numeral 100. The electrostatic sprayer 100 includes a main unit 105, a spray gun 110, and a hose 112 connecting the main unit 105 to the spray gun 110.

Figure 1B:
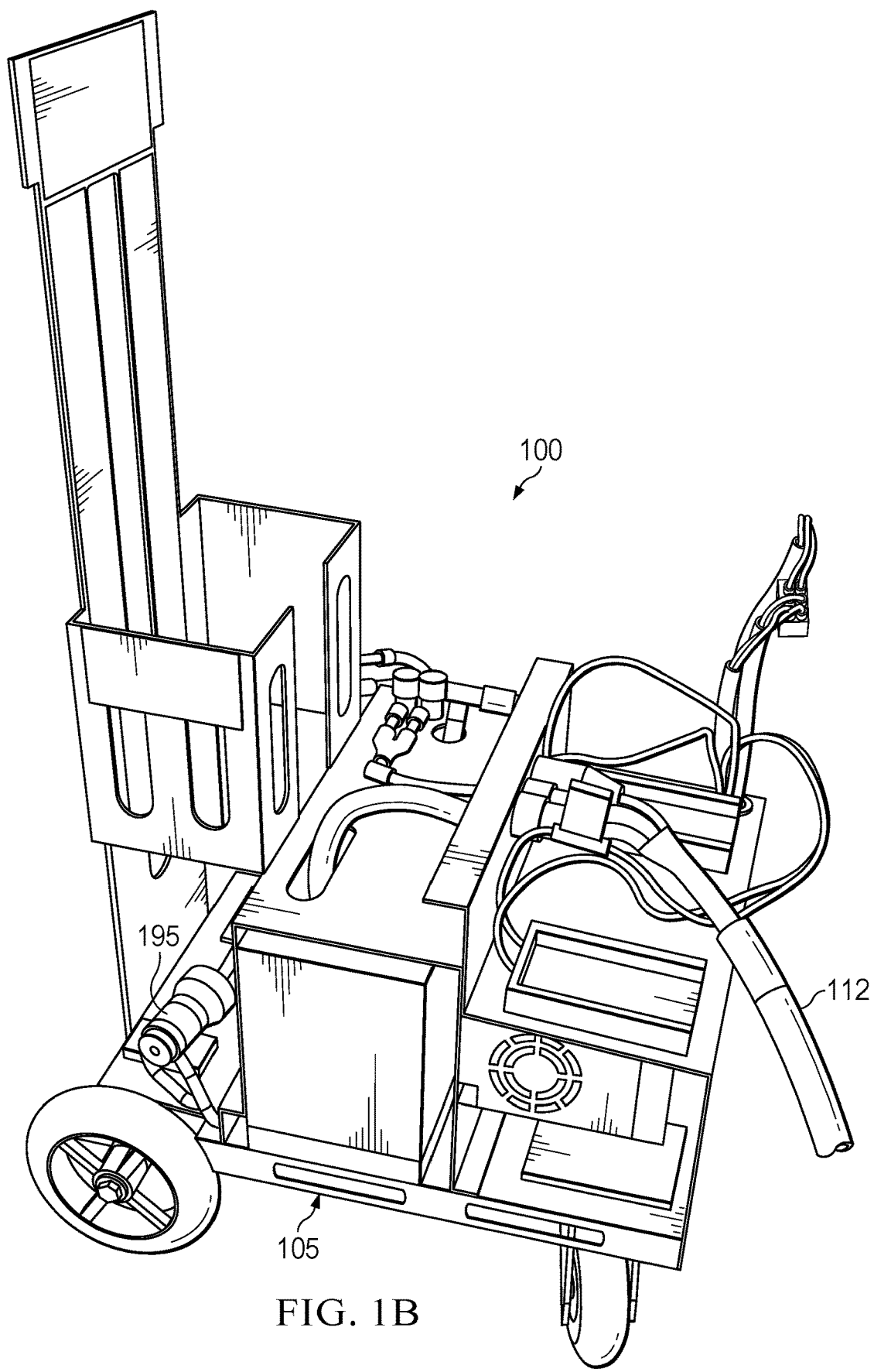
FIG. 1B is a perspective view of a main unit and a hose of the electrostatic sprayer of FIG. 1A, according to one or more embodiments.
Figure 1C:
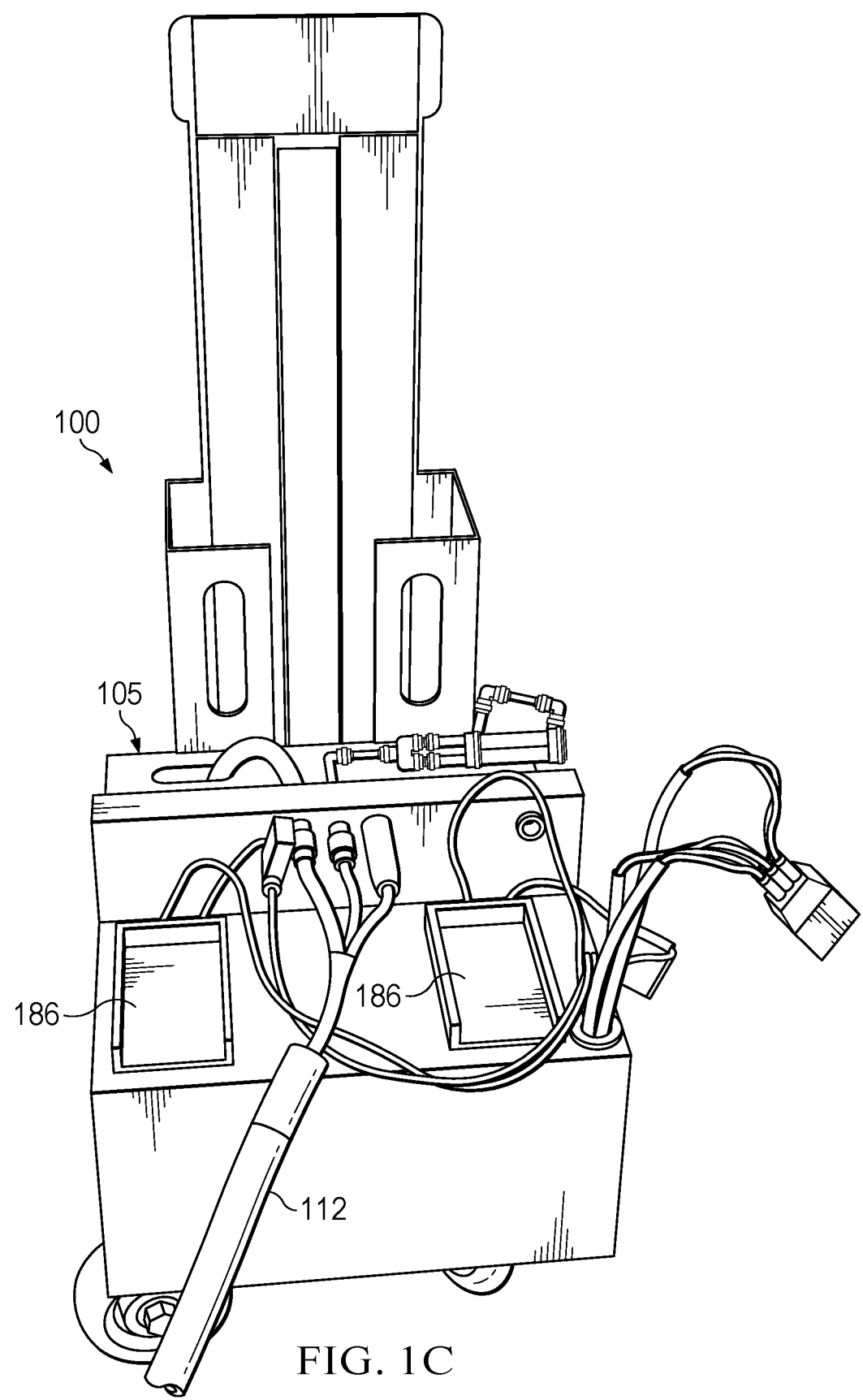
FIG. 1C is another perspective view of the main unit and the hose of the electrostatic sprayer of FIG. 1A, according to one or more embodiments.

As shown in FIG. 1A, with continuing reference to FIGS. 1B and 1C, the main unit 105 includes a control system 115, a power system 120, a fluid system 125, an air system 130, a communication bus 135, and a main connector 140. The power system 120 is connectable to, and adapted to receive electric power from, a power source spaced apart from the main unit 105. In one or more embodiments, as in FIG. 1A, the power source is an alternating current ("A/C") power source. In other embodiments, the power source is a direct current ("D/C") power source (e.g., one or more batteries, fuel cell(s), solar panel(s), or any combination(s) thereof). The power system 120 is also connected to, and communicates electric power to, the control system 115, the fluid system 125, the air system 130, and the main connector 140. The control system 115 is connected to, and receives electric power from, the power system 120. The control system 115 is also connected to, and communicates data/signal(s) to/from, the communication bus 135.

The fluid system 125 is connected to, and receives electric power from, the power system 120. The fluid system 125 is also connected to, and communicates data/signal(s) to/from, the communication bus 135. The fluid system 125 is also connected to, and communicates spray media (e.g., anti-microbial and/or anti-viral surface coating) to, the main connector 140. The air system 130 is connected to, and receives electric power from, the power system 120. The air system 130 is also connected to, and communicates data/signal(s) to/from, the communication bus 135. The air system 130 is also connected to, and communicates air to, the main connector 140. The communication bus 135 (also shown in FIG. 2B) is connected to, and communicates data/signal(s) to/from, the control system 115, the fluid system 125, the air system 130, and the main connector 140. The main connector 140 is connected to, and receives electric power from, the power system 120. The main connector 140 is also connected to, and receives spray media from, the fluid system 125. The main connector 140 is also connected to, and receives air from, the air system 130. The main connector 140 is also connected to, and communicates data/signal(s) to/from, the communication bus 135.

Figure 1D:
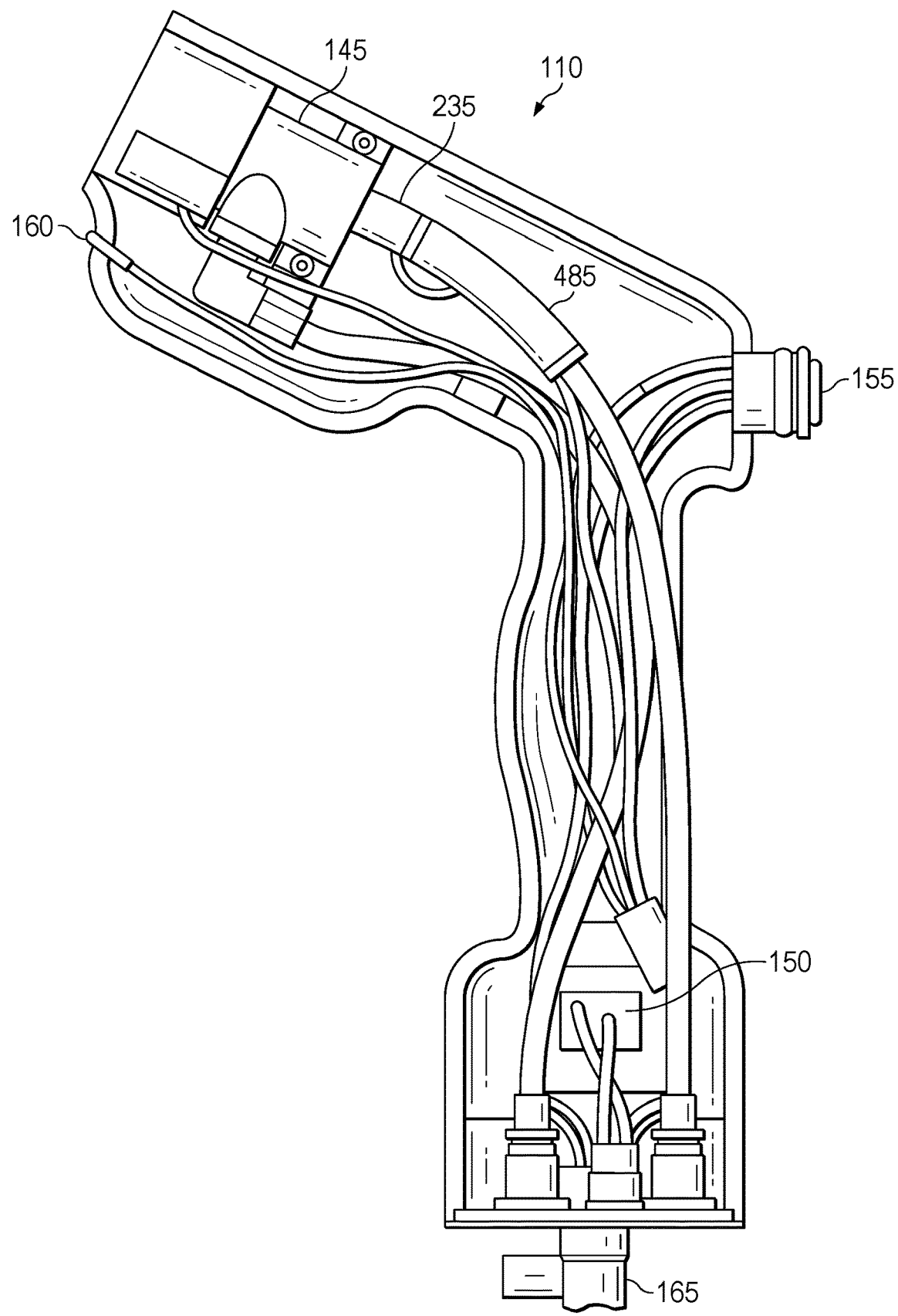
FIG. 1D is a sectional view of a spray gun of the electrostatic sprayer of FIG. 1A, according to one or more embodiments.

As shown in FIGS. 1A and 1D, the spray gun 110 includes a nozzle 145, a generator 150, an input device 155 (e.g., a switch), a light 160 (e.g., an LED light), and a gun connector 165. The electrostatic sprayer 100 is capable of pre-charging air and/or spray media at the nozzle 145 before charging an atomized mixture of the air and the spray media at the nozzle 145 to create consistent and precise coverage, as will be described in further detail below. The hose 112 is connected between the main unit 105 and the spray gun 110. More particularly, the hose 112 includes hose connectors 170a and 170b at opposing ends thereof, which hose connector 170a is detachably connected to the main connector 140, and which hose connector 170b is detachably connected to the gun connector 165. In one or more embodiments, the hose connector 170a is or includes a "quick-connect" fitting that is attachable/detachable to/from a corresponding quick-connect fitting of the main connector 140, and vice versa. Similarly, in one or more embodiments, the hose connector 170a is or includes a quick-connect fitting that is attachable/detachable to/from a corresponding quick-connect fitting of the gun connector 165, and vice versa. The quick-connect fittings enable fast break down and storage of the electrostatic sprayer 100. The nozzle 145 is connected to, and receives electrostatic charge(s) from, the generator 150. The nozzle 145 is also connected to the gun connector 165. The nozzle 145 receives spray media (from the fluid system 125) via the gun connector 165 (in addition to the main connector 140 and the hose connectors 170a and 170b). The nozzle 145 also receives air (from the air system 130) via the gun connector 165 (in addition to the main connector 140 and the hose connectors 170a and 170b).

The generator 150 is connected to, and communicates electrostatic charge(s) to, the nozzle 145. In one or more embodiments, the generator 150 is a negative ion generator. The generator 150 is also connected to the gun connector 165. The generator 150 receives electric power (from the power system 120) via the gun connector 165 (in addition to the main connector 140 and the hose connectors 170a and 170b). The generator 150 also communicates data/signal(s) (to/from the communication bus 135) via the gun connector 165 (in addition to the main connector 140 and the hose connectors 170a and 170b). The input device 155 is connected to both the light 160 and the gun connector 165. The input device 155 receives electric power (from the power system 120) via the gun connector 165 (in addition to the main connector 140 and the hose connectors 170a and 170b), and relays electric power to the light 160. The input device 155 also communicates data/signal(s) (to/from the communication bus 135) via the gun connector 165 (in addition to the main connector 140 and the hose connectors 170a and 170b). The light 160 is connected to, and receives electric power from, the input device 155 to illuminate spray from the nozzle 145 for accurate application to target surfaces.

The input device 155 is actuable between "off," "high," and "low" spray modes, thus providing dual flow control to the electrostatic sprayer 100 to allow a user to quickly change between high and low flow rates for increased efficiency, improved productivity, and precise application, as will be described in further detail below. Additionally, the input device 155 is actuable between "on" and "off" electrostatic charge modes, as will be described in further detail below. In one or more embodiments, the input device 155 includes multiple independent switches; for example, the input device 155 may include a first switch that is actuable between the "off," "high," and "low" spray modes, and a second switch that is actuable between the "on" and "off" electrostatic charge modes.

The gun connector 165 is connected to, and communicates spray media (from the fluid system 125) and air (from the air system 130) to, the nozzle 145. The gun connector 165 is also connected to, communicates electric power (from the power system 120) to, and communicates data/signal(s) (to/from the communication bus 135) to/from, the generator 150. The gun connector 165 is also connected to, communicates electric power (from the power system 120) to, and communicates data/signal(s) (to/from the communication bus 135) to/from, the input device 155.

Figure 2A:
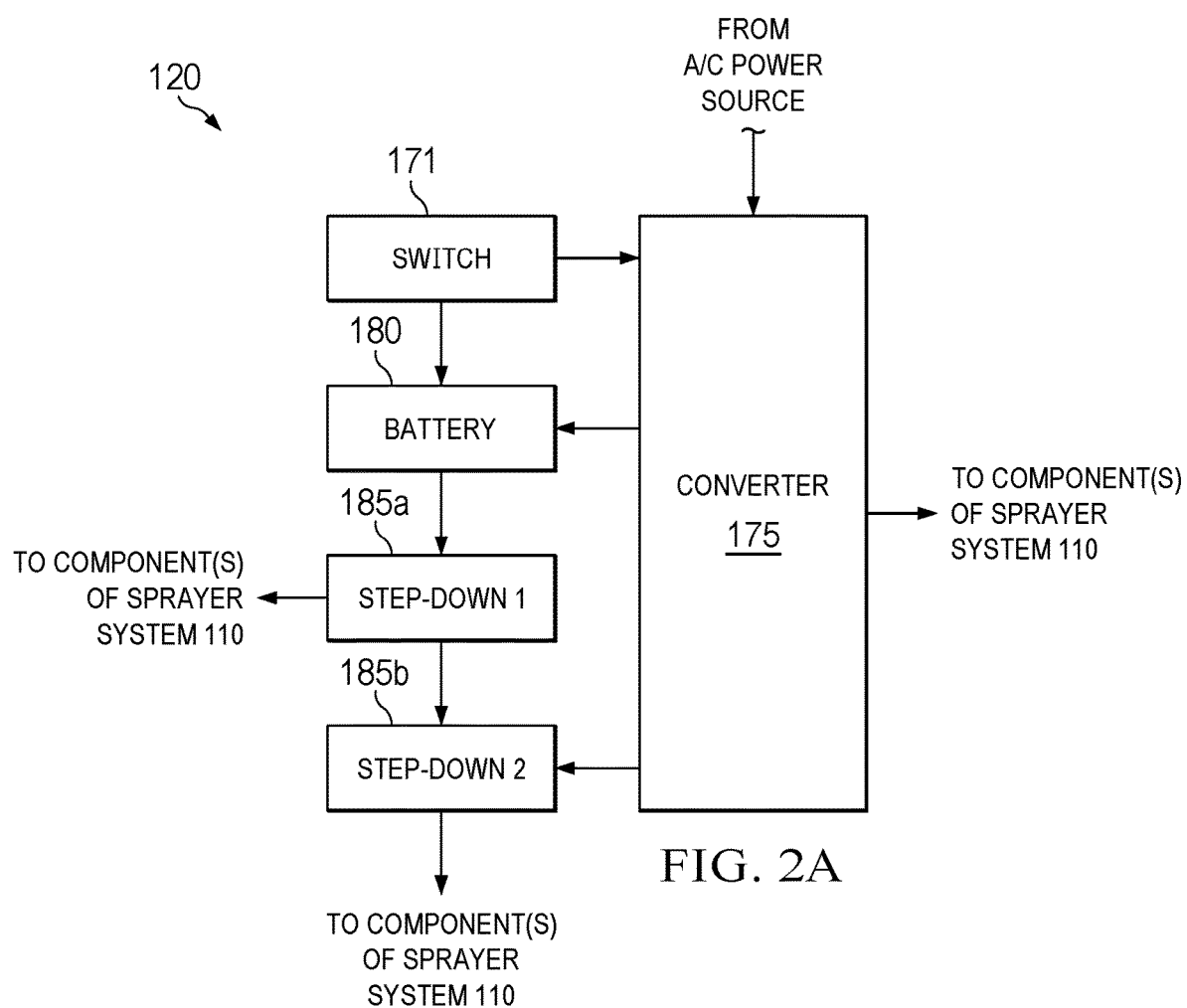
FIG. 2A is a diagrammatic illustration of a power system of the electrostatic sprayer of FIG. 1A, according to one or more embodiments.
Figure 2B:
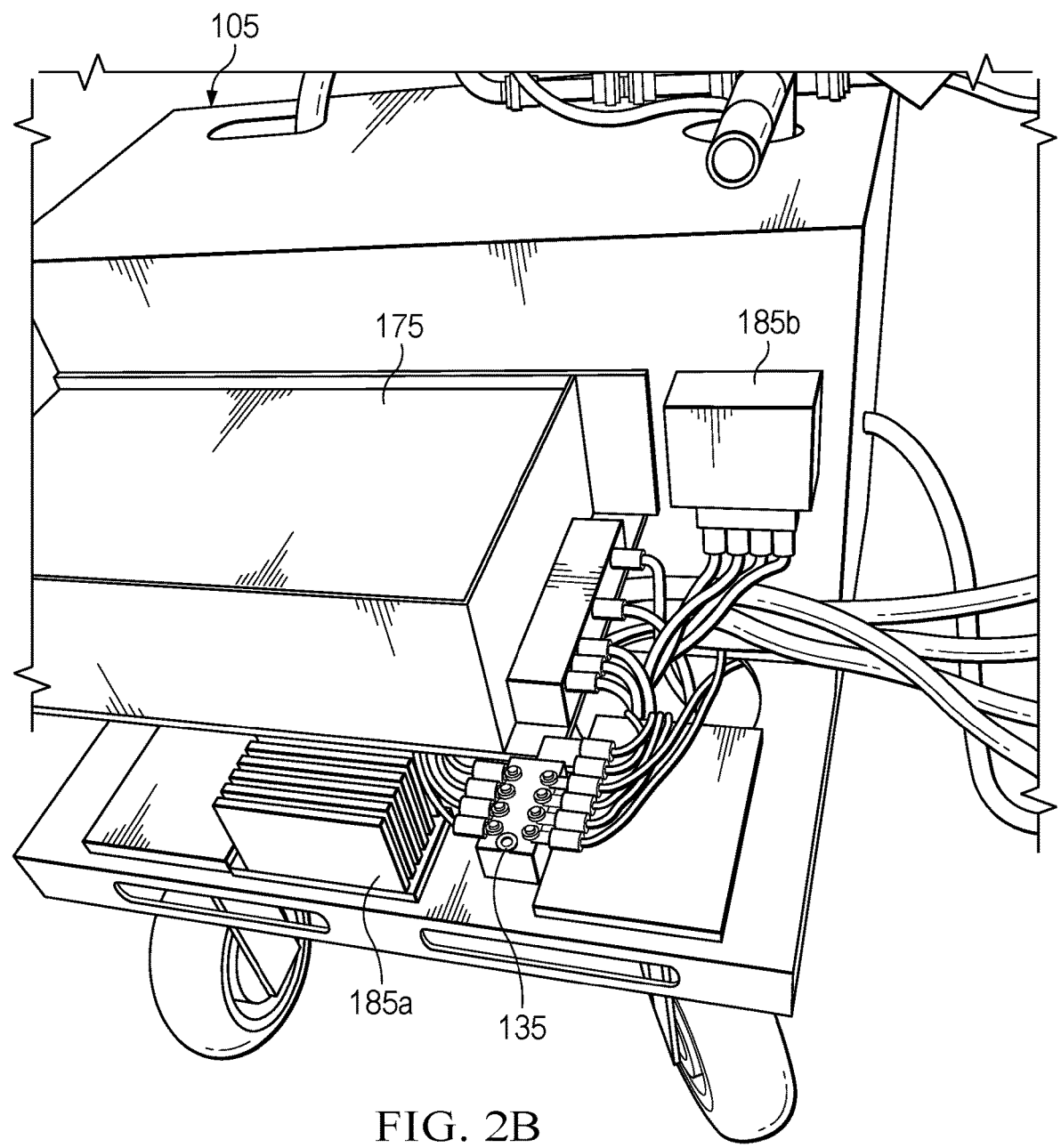
FIG. 2B is a perspective view of the power system of FIG. 2A, according to one or more embodiments.
Figure 3A:
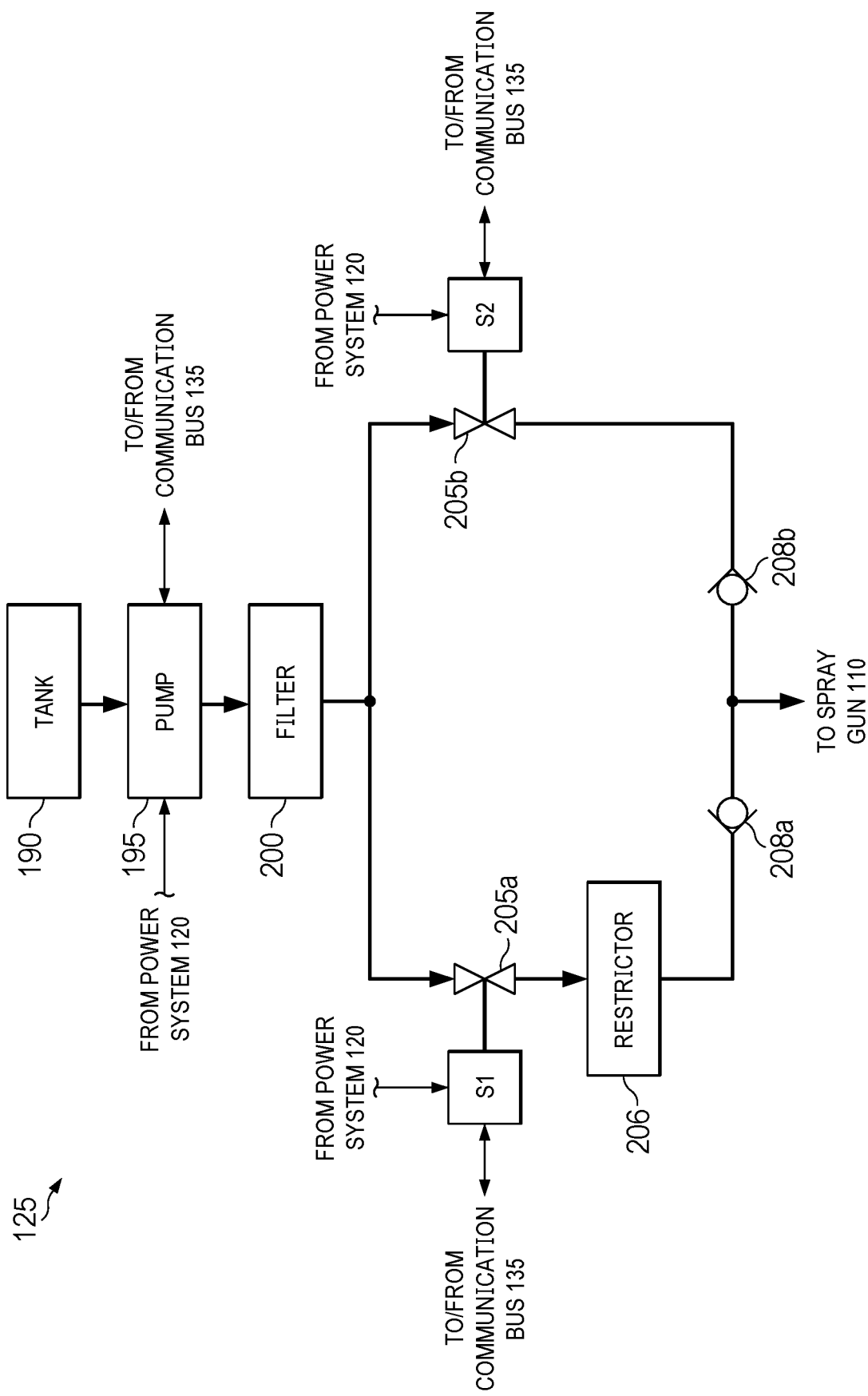
FIG. 3A is a diagrammatic illustration of a fluid system of the electrostatic sprayer of FIG. 1A, according to one or more embodiments.
Figure 3B:
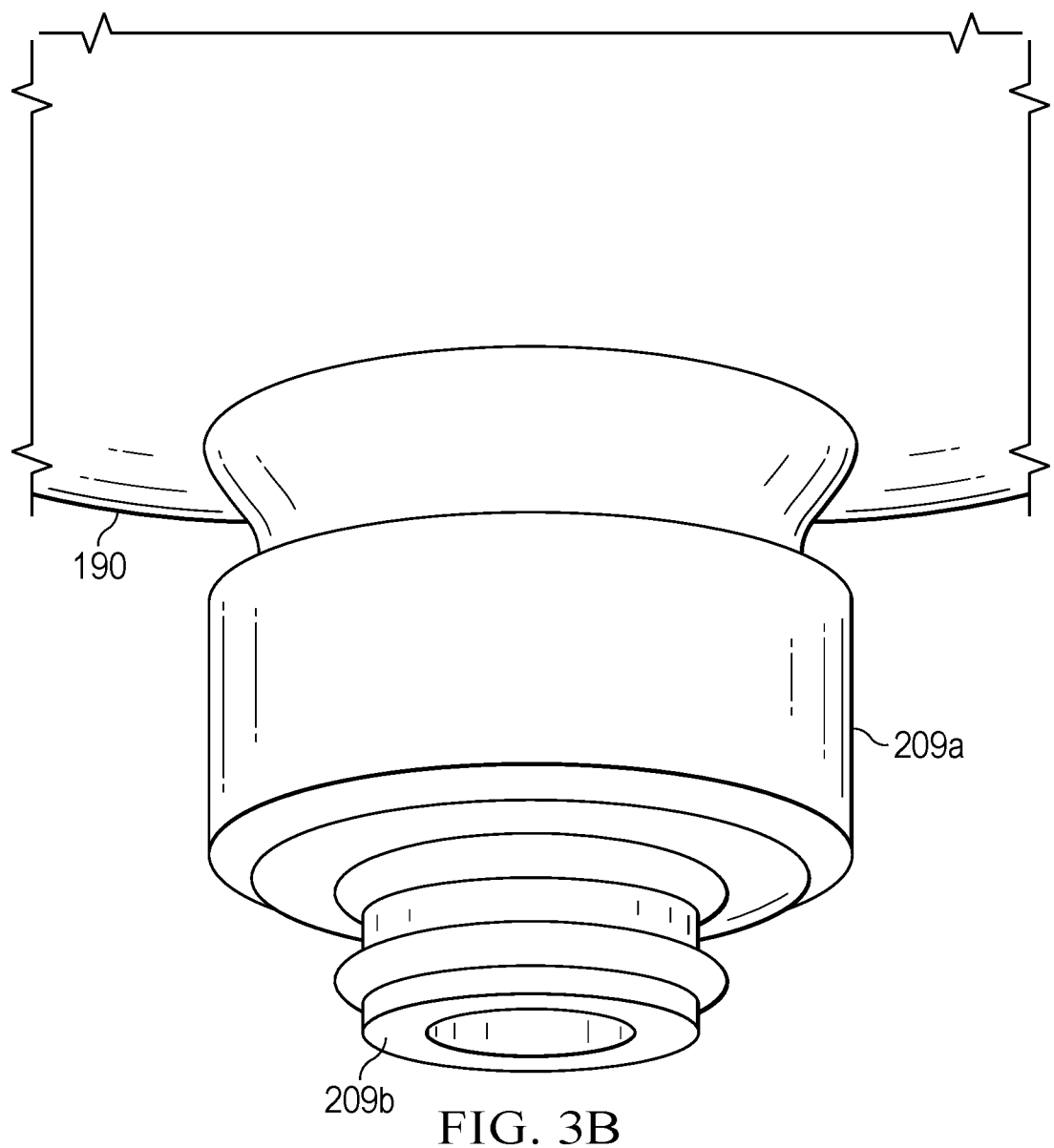
FIG. 3B is a perspective view of a container of the fluid system of FIG. 3A, the container including an auto feeder valve, according to one or more embodiments.
Figure 3C:
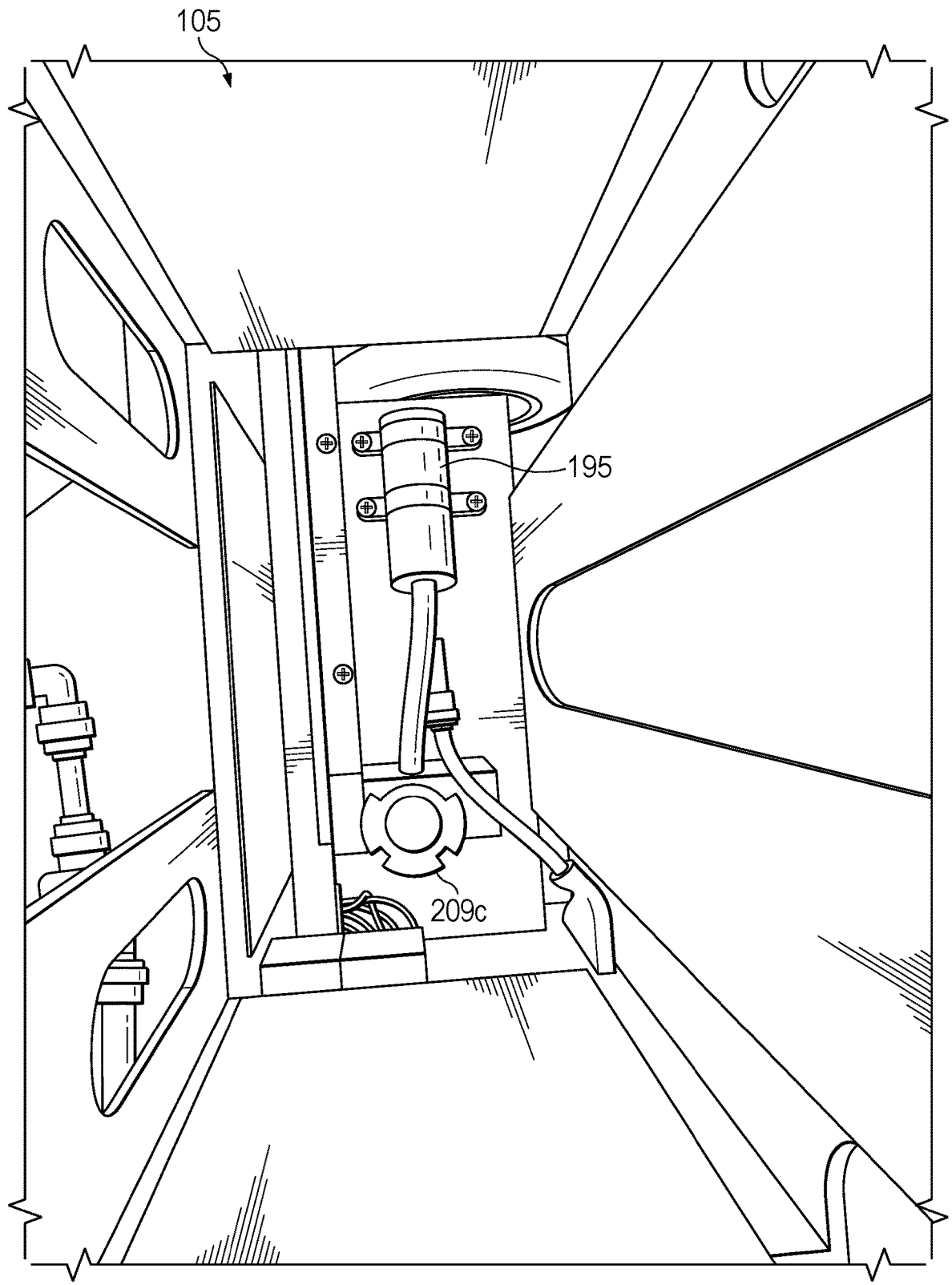
FIG. 3C is a perspective view of a pump of the fluid system of FIG. 3A, the pump being connected to an auto feeder receptacle, according to one or more embodiments.
Figure 3D:
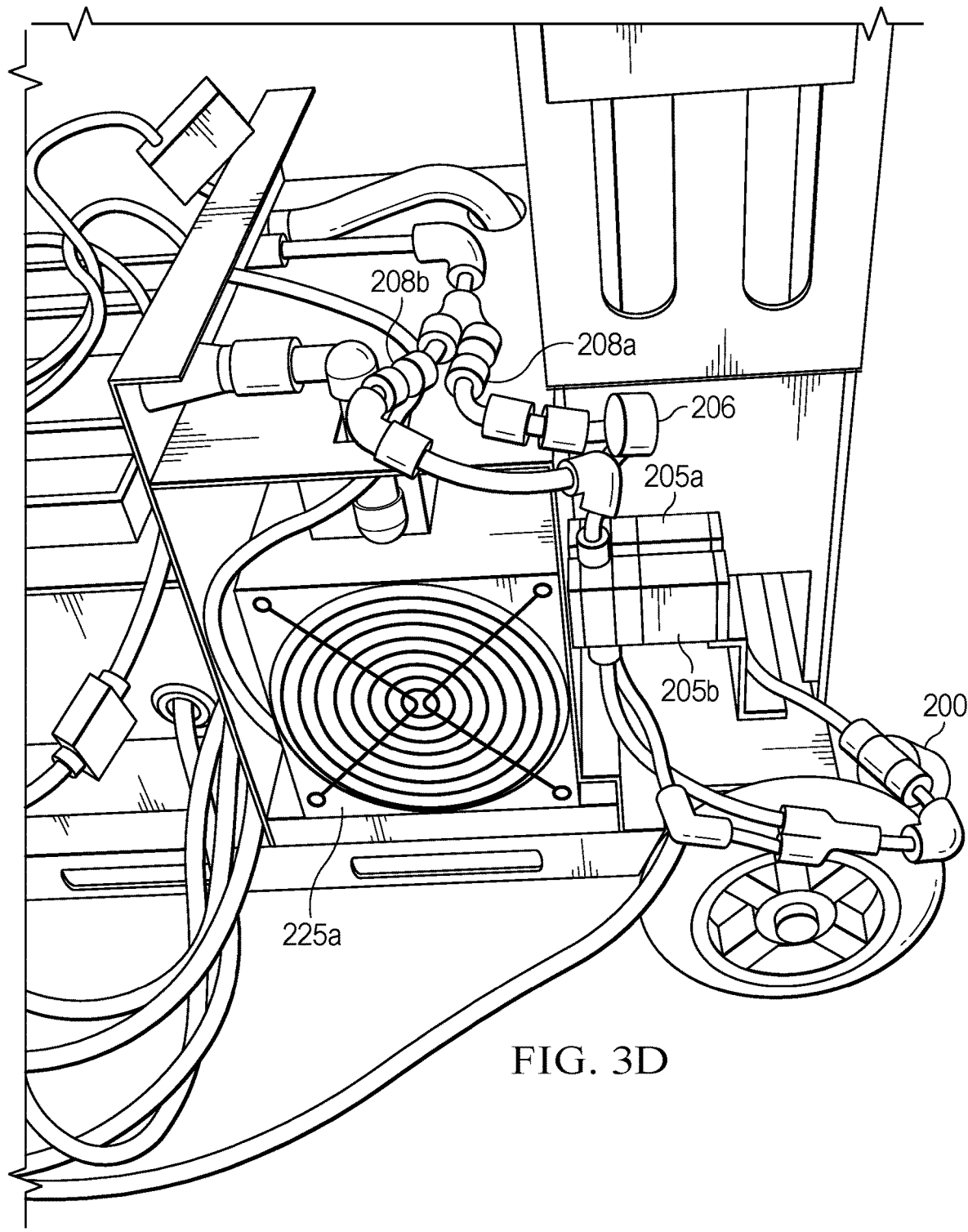
FIG. 3D is a perspective view of various components of the fluid system of FIG. 3A, according to one or more embodiments.
Figure 3E:
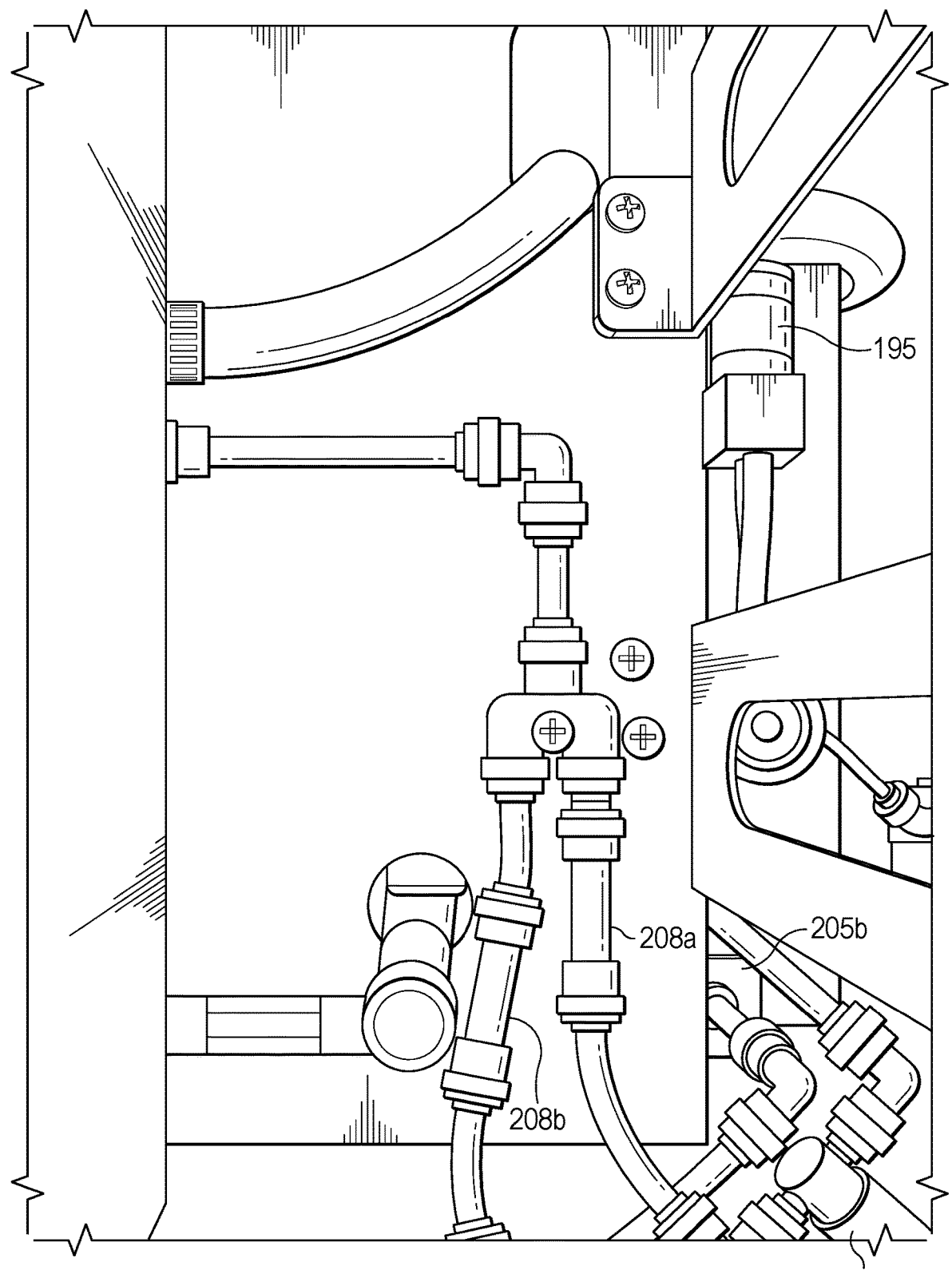
FIG. 3E is an enlarged perspective view of various components of the fluid system of FIG. 3A, together with various components of an air system (shown in FIG. 4) of the electrostatic sprayer, according to one or more embodiments.

Referring to FIGS. 2A and 2B, with continuing reference to FIG. 1A, in an embodiment, the power system 120 includes an input device 171 (e.g., a switch), a converter 175, a battery 180, a step-down 185a, and a step-down 185b. The converter 175 is connectable to, and adapted to receive electric power from, the power source (e.g., the A/C power source). In one or more embodiments, the converter 175 converts 110V or 220V A/C electric power from the power source into 24V D/C power. The converter 175 is also connected to, and communicates electric power to, the battery 180, the step-down 185b, and other component(s) of the electrostatic sprayer 100. The battery 180 is connected to, and receives electric power from, the converter 175. In one or more embodiments, the battery 180 is or includes a pair of 40V 6AH battery cells (connection terminals 186 for the battery cells are visible in FIG. 1C). The battery 180 is also connected to, and communicates electric power to, the step-down 185a. The step-down 185a is connected to, and receives electric power from, the battery 180. In one or more embodiments, the step-down 185a converts 48V D/C electric power from the battery 180 into 24V D/C electric power. The step-down 185a is also connected to, and communicates electric power to, the step-down 185b and other component(s) of the electrostatic sprayer 100. The step-down 185b is connected to, and receives electric power from, the converter 175 and the step-down 185a. In one or more embodiments, the step-down 185b converts 24V D/C electric power from the converter 175 into 12V D/C electric power. In addition, or instead, the step-down 185b can convert 24V D/C electric power from the step-down 185a into 12V D/C electric power. The step-down 185b is also connected to, and communicates electric power to, other component(s) of the electrostatic sprayer 100.

The input device 171 is actuable between "off," "external," and "on-board" power modes, thus providing "dual power" capability to the electrostatic sprayer 100. in one or more embodiments, actuating the input device 171 to the "external" power mode causes the power system 120 to supply power from the A/C power source (or, alternatively, the D/C power source) to component(s) of the electrostatic sprayer 100, via the converter 175 and, optionally, the step-down 185b, as will be described in further detail below. Alternatively, actuating the input device 171 to the "on-board" power mode causes the power system 120 to supply power from the battery 180 to component(s) of the electrostatic sprayer 100, via the step-down 185a and/or the step-down 185b, as will be described in further detail below. Alternatively, the input device 171 may be omitted and the power system 120 may itself be automatically actuable between the "off," "external," and "on-board" power modes based on, for example, whether or not the main unit 105 is plugged into the A/C (or D/C) power source (e.g., unplugging the main unit 105 from the power source automatically places the electrostatic sprayer 100 in the "on-board" power mode, plugging the main unit 105 into the power source automatically places the electrostatic sprayer 100 in the "external" power mode, etc.).

Referring to FIGS. 3A-3E, with continuing reference to FIG. 1A, in an embodiment, the fluid system 125 includes a container 190 (e.g., a tank, a bottle, a jar, etc., or a combination thereof), a pump 195, a filter 200, solenoid valves 205a and 205b, a restrictor 206, and check valves 208a and 208b. The container 190 is connectable to, and communicates spray media to, the pump 195. The container 190 is removable from the main unit 105 for refilling. The container 190 includes a removable cap 209a (shown in FIG. 3B) for refilling. In one or more embodiments, the container 190 also includes an auto feeder valve 209b adapted to close when the container 190 is detached from the main unit 105, and to open when the container 190 is reattached to the main unit 105. More particularly, the auto feeder valve 209b is attachable to, and detachable from, an auto feeder receptacle 209c (shown in FIG. 3C) of the main unit 105.

The pump 195 is connected to, and receives spray media from, the container 190. The pump 195 is also connected to, and receives electric power from, the power system 120. For example, the pump 195 may receive electric power from the converter 175 via the step-down 185b (when the A/C power source is connected and the input device 171 is actuated to the "external" power mode). In addition, or instead, the pump 195 may receive electric power from the battery 180 via the step-down 185a and the step-down 185b (when the input device 171 is actuated to the "on-board" power mode). In one or more embodiments, the pump 195 includes a 12V electric motor. The pump 195 is also connected to, and communicates data/signal(s) to/from, the communication bus 135. The pump 195 is also connected to, and communicates pressurized spray media to, the filter 200. The filter 200 is connected to, and receives pressurized spray media from, the pump 195. The filter 200 is also connected to, and communicates filtered spray media to, the solenoid valves 205a and 205b.

The solenoid valves 205a and 205b are connected in parallel to the filter 200. As a result, each of the solenoid valves 205a and 205b receives filtered spray media from, the filter 200. The solenoid valves 205a and 205b are each also connected to, and receive electric power from, the power system 120. For example, the solenoid valves 205a and 205b may each receive electric power from the step-down 185b. In one or more embodiments, each of the solenoid valves 205a and 205b includes a 12V solenoid actuator. The solenoid valves 205a and 205b are each also connected to, and communicate data/signal(s) to/from, the communication bus 135. The solenoid valve 205a is also connected to, and adapted to communicate spray media to, the restrictor 206. In one or more embodiments, the restrictor 206 is or includes a valve such as, for example a ball valve. The restrictor 206 is connected to, and receives spray media from, the solenoid valve 205a. The restrictor 206 is also connected to, and communicates spray media to, the spray gun 110 (i.e., the nozzle 145). The check valve 208a is connected between the restrictor 206 and the spray gun 110 to prevent backflow of spray media from the spray gun 110 to the restrictor 206. The solenoid valve 205b is also connected to, and adapted to communicate spray media to, the spray gun 110 (i.e., the nozzle 145). The check valve 208b is connected between the solenoid valve 205b and the spray gun 110 to prevent backflow of spray media from the spray gun 110 to the solenoid valve 205b.

Figure 4:
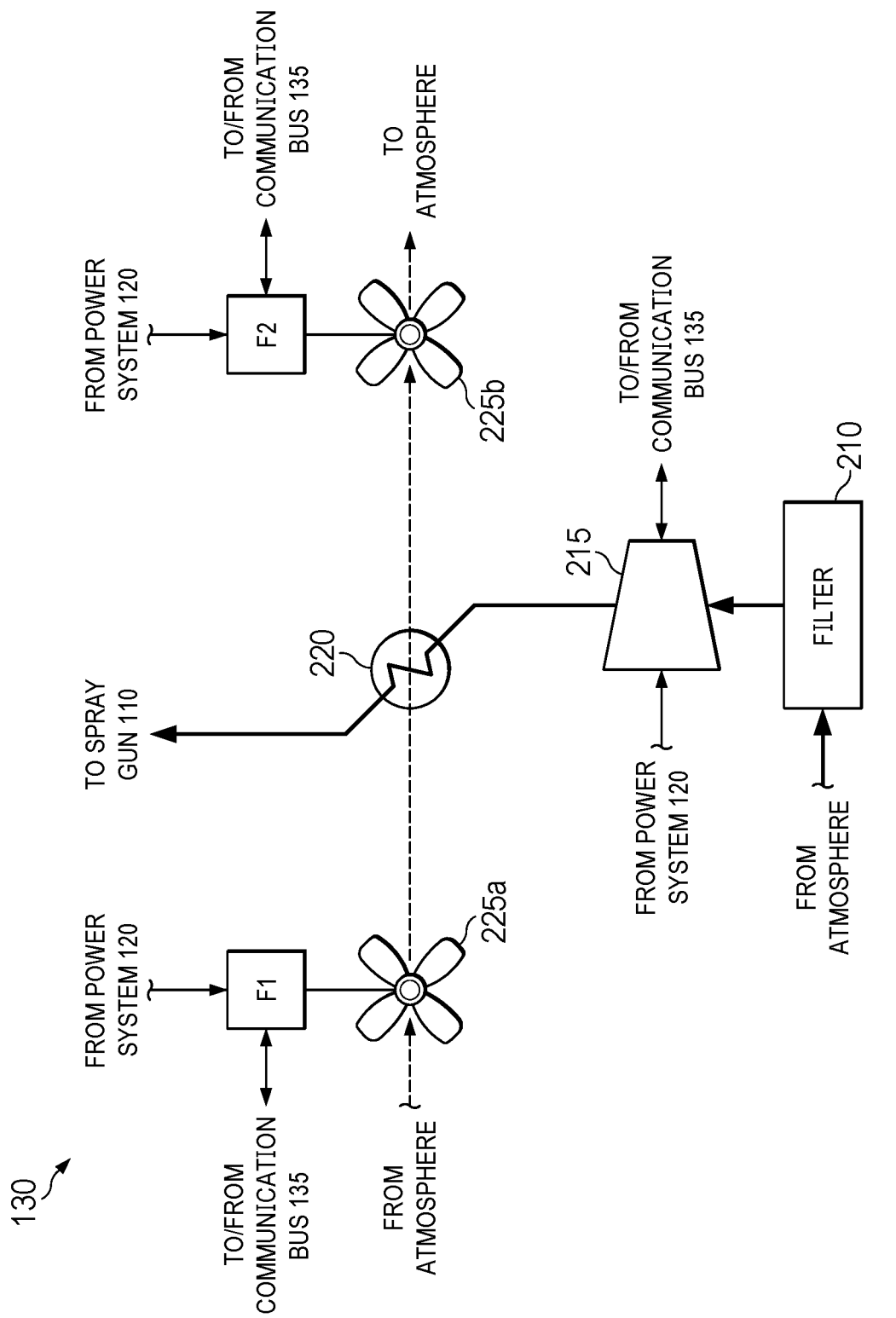
FIG. 4 is a diagrammatic illustration of an air system of the electrostatic sprayer of FIG. 1A, according to one or more embodiments.

Referring to FIG. 4, with continuing reference to FIG. 1A, in an embodiment, the air system 130 includes a filter 210, a compressor 215, a radiator 220, and fans 225a and 225b. The filter 210 is connected to, and communicates air (e.g., air from atmosphere) to, the compressor 215. The compressor 215 is connected to, and receives air from, the filter 210. The compressor 215 is also connected to, and receives electric power from, the power system 120. For example, the compressor 215 may receive electric power directly from the converter 175 (when the A/C power source is connected and the input device 171 is actuated to the "external" power mode). In addition, or instead, the compressor 215 may receive electric power from the battery 180 via the step-down 185a (when the input device 171 is actuated to the "on-board" power mode). In one or more embodiments, the compressor 215 includes a 24V electric motor. The compressor 215 is also connected to, and communicates data/signa(s) to/from, the communication bus 135. The compressor 215 is also connected to, and communicates pressurized air to, the radiator 220. The radiator 220 is connected to, and receives pressurized air from, the compressor 215. The radiator 220 is also connected to, and communicates air to, the spray gun 110 (i.e., the nozzle 145).

The fans 225a and 225b are each connected to, and receive electric power from, the power system 120. For example, the fans 225a and 225b may each receive electric power from the step-down 185b. In one or more embodiments, each of the fans 225a and 225b includes a 12V electric motor. The fans 225a and 225b are each also connected to, and communicate data/signal(s) to/from, the communication bus 135. The fans 225a and 225b move cooling air through the radiator 220 to cool the pressurized air also flowing through the radiator 220. In addition, or instead, the fans 225a and 225b can move the cooling air through a compartment in which the compressor 215 is contained to thereby cool the compressor 215 by removing heat from the compartment. Although described herein as including the two (2) fans 225a and 225b, in one or more embodiments, the air system 130 may include one (1), three (3), or more fans substantially identical to the fans 225a and 225b.

Referring to FIGS. 5A-5F, with continuing reference to FIGS. 1A, 1D, 3A, and 4, in an embodiment, the nozzle 145 includes a nozzle body 230, a fluid electrode 235 (also shown in FIG. 1D), a static charge ring 240, an air chamber spacer 245, and a nozzle tip 250.

Figure 5A:
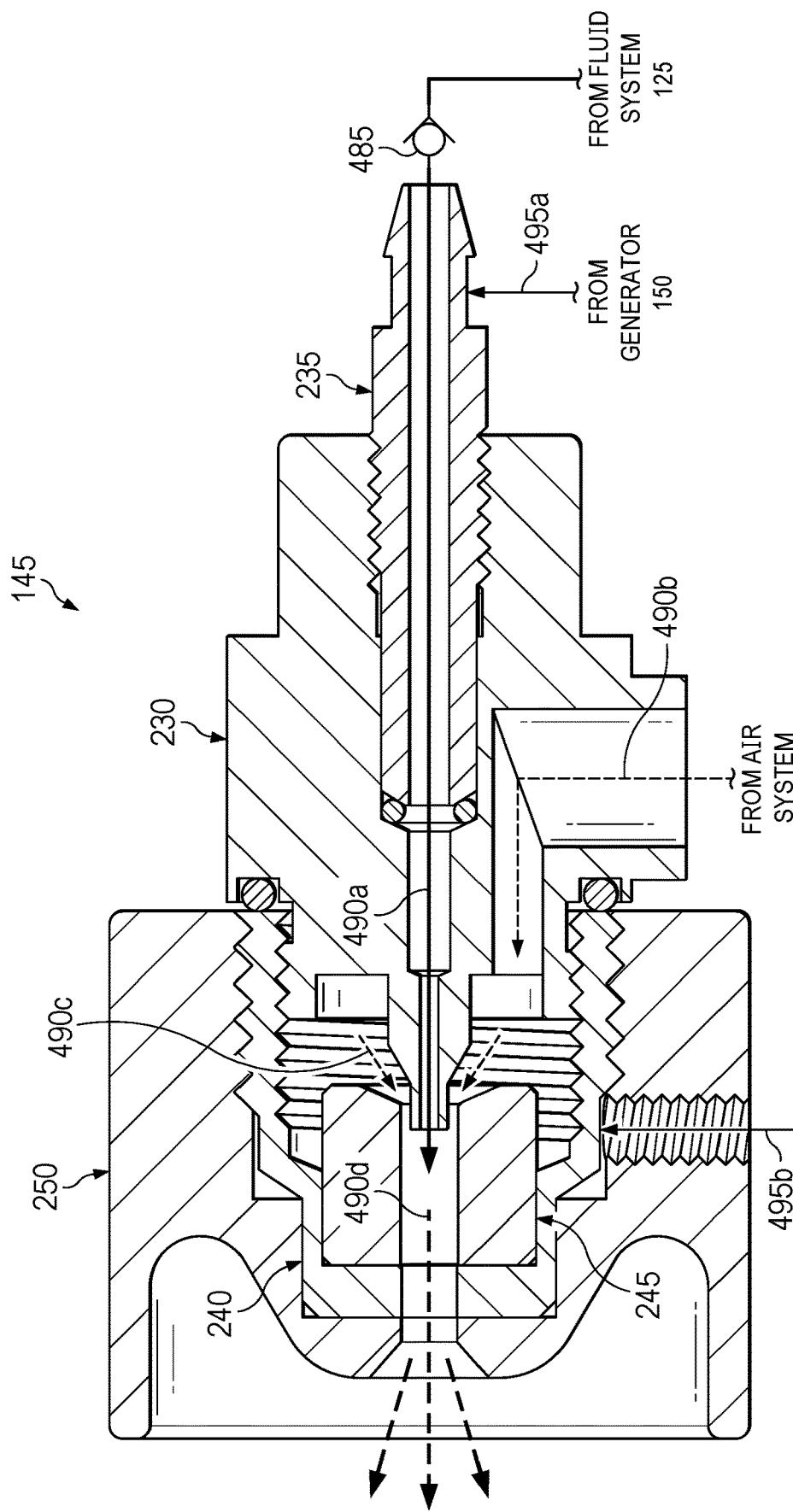
FIG. 5A is a cross-sectional view of a nozzle of the spray gun of FIG. 1D, according to one or more embodiments.
Figure 5B:
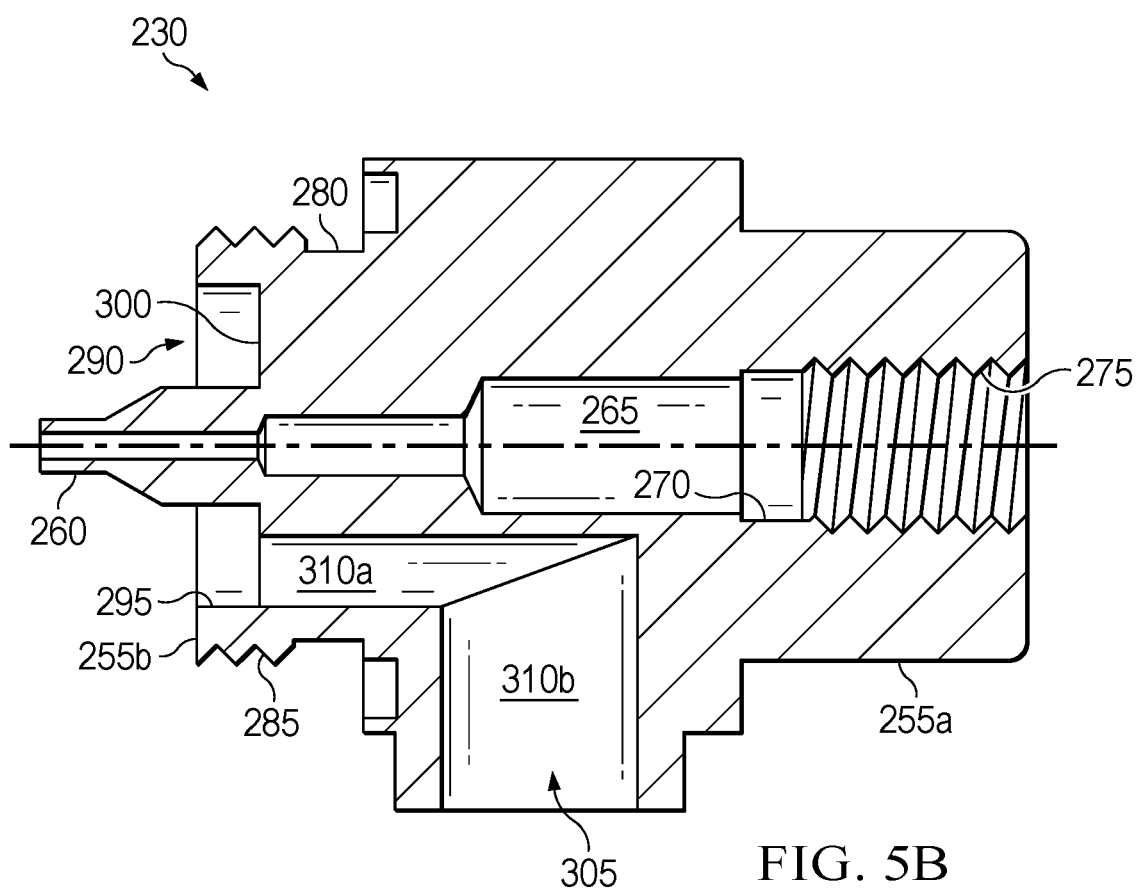
FIG. 5B is a cross-sectional view of a nozzle body of the nozzle of FIG. 5A, according to one or more embodiments.

As shown in FIG. 5B, in an embodiment, the nozzle body 230 defines opposing inlet and outlet end portions 255a and 255b. The nozzle body 230 includes a tip portion 260 extending axially from the outlet end portion 255b. An internal passageway 265 is formed axially through the nozzle body 230, including the tip portion 260, from the inlet end portion 255a to the outlet end portion 255b. The internal passageway 265 defines an internal surface 270 in the nozzle body 230 at the inlet end portion 255a. An internal threaded connection 275 is formed into the internal surface 270. The nozzle body 230 includes an external surface 280 at the outlet end portion 255b, which external surface 280 extends around at least a proximal end portion of the tip portion 260. An external threaded connection 285 is formed into the external surface 280. An annular chamber 290 is formed axially into the nozzle body 230 at the outlet end portion 255b. The annular chamber 290 extends radially between the tip portion 260 and the external surface 280, defining an internal surface 295 and a face surface 300 in the nozzle body 230. An internal passageway 305 is also formed through the nozzle body 230. The internal passageway 305 includes an axially-extending portion 310a and a radially-extending portion 310b. The axially-extending portion 310a of the internal passageway 305 extends through the face surface 300 and into the nozzle body 230. The radially-extending portion 310b of the internal passageway 305 extends outwardly through the nozzle body 230 from the axially-extending portion 310a of the internal passageway 305, exiting the nozzle body 230 at a location between the inlet end portion 255a and the outlet end portion 255b.

Figure 5C:
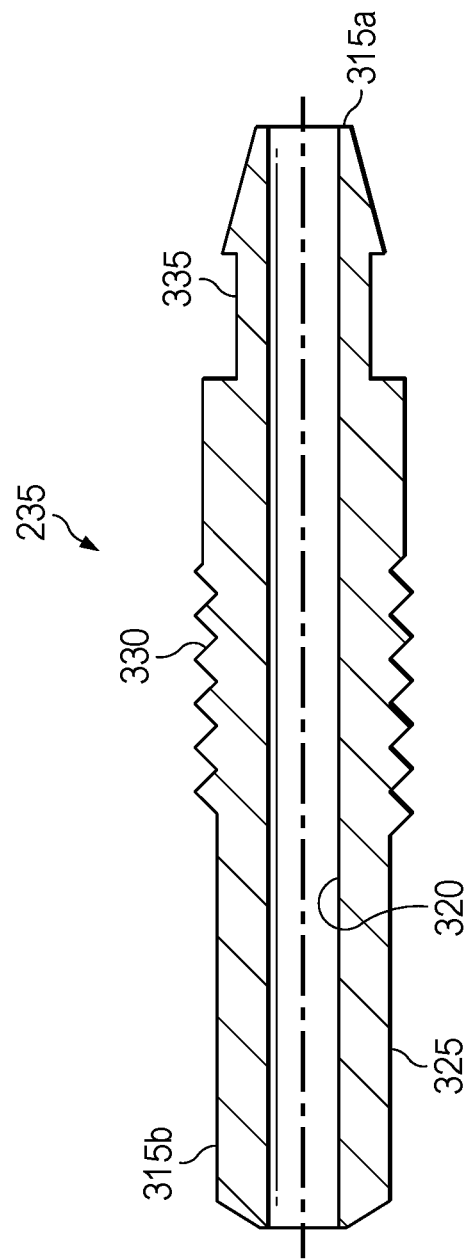
FIG. 5C is a cross-sectional view of a fluid electrode of the nozzle of FIG. 5A, according to one or more embodiments.

As shown in FIG. 5C, in an embodiment, the fluid electrode 235 defines opposing inlet and outlet end portions 315a and 315b. An internal passageway 320 is formed axially through the fluid electrode 235, from the inlet end portion 315a to the outlet end portion 315b. The fluid electrode 235 includes an external surface 325. An external threaded connection 330 is formed into the external surface 325, between the inlet end portion 315a and the outlet end portion 315b. The external threaded connection 330 of the fluid electrode 235 threadably engages the internal threaded connection 275 of the nozzle body 230 (shown in FIG. 5A) so that the internal passageway 320 of the fluid electrode 235 communicates with the internal passageway 265 of the nozzle body 230. The fluid electrode 235 also includes an electrode fitting 335 at the inlet end portion 315a, which electrode fitting 335 extends axially from the inlet end portion 255a of the nozzle body 230 (shown in FIG. 5A). In one or more embodiments, the fluid electrode 235 is or includes aluminum.

Figure 5D:
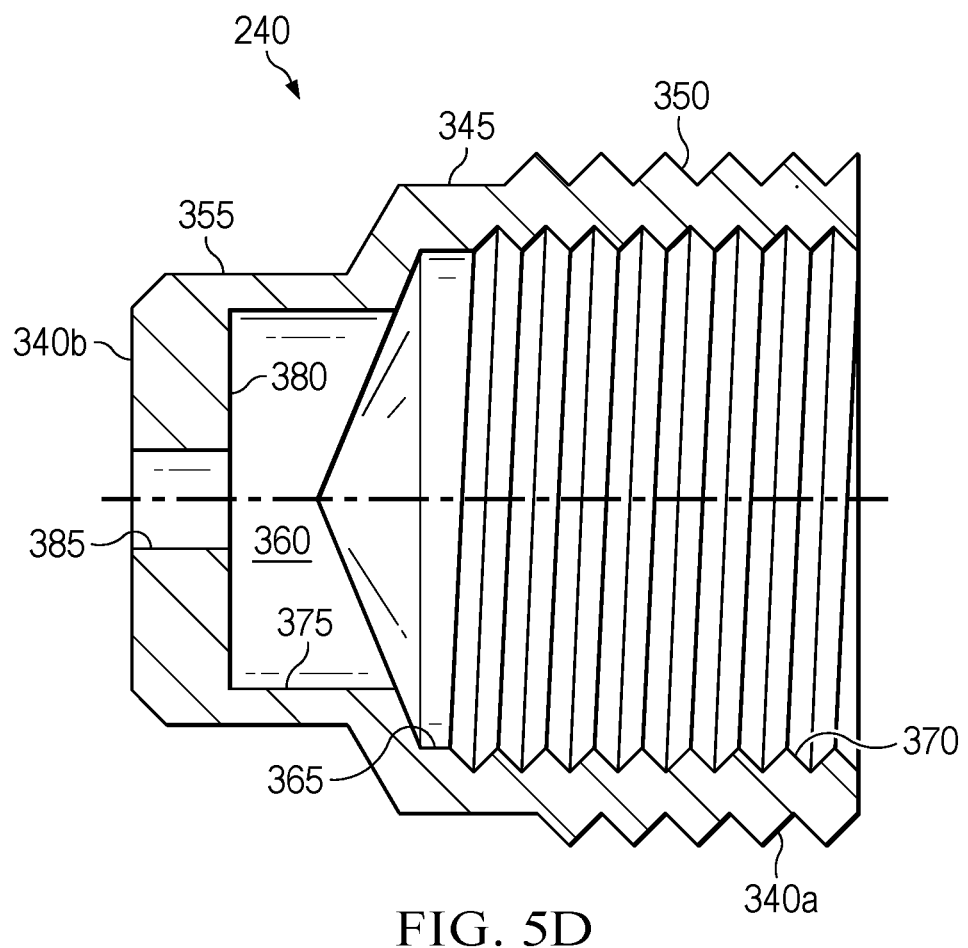
FIG. 5D is a cross-sectional view of a static charge ring of the nozzle of FIG. 5A, according to one or more embodiments.

As shown in FIG. 5D, in an embodiment, the static charge ring 240 defines opposing inlet and outlet end portions 340a and 340b. The static charge ring 240 includes an enlarged-diameter external surface 345. An external threaded connection 350 is formed in the enlarged-diameter external surface 345 at the inlet end portion 340a. The static charge ring 240 also includes a reduced-diameter external surface 355 at the outlet end portion 340b. An internal chamber 360 is formed axially into the inlet end portion 340a of the static charge ring 240. The internal chamber 360 defines an enlarged-diameter internal surface 365 in the static charge ring 240 at the inlet end portion 340a. An internal threaded connection 370 is formed into the enlarged-diameter internal surface 365. The internal threaded connection 370 of the static charge ring 240 threadably engages the external threaded connection 285 of the nozzle body 230 (shown in FIG. 5A) so that the internal chamber 260 of the static charge ring 240 communicates with the annular chamber 290 (and thus the internal passageway 305) of the nozzle body 230. The internal chamber 360 also defines a reduced-diameter internal surface 375 and a face surface 380 in the static charge ring 240. An internal passageway 385 extends from the internal chamber 360 axially through the static charge ring 240, including the face surface 380, exiting the static charge ring 240 at the outlet end portion 340b.

Figure 5E:
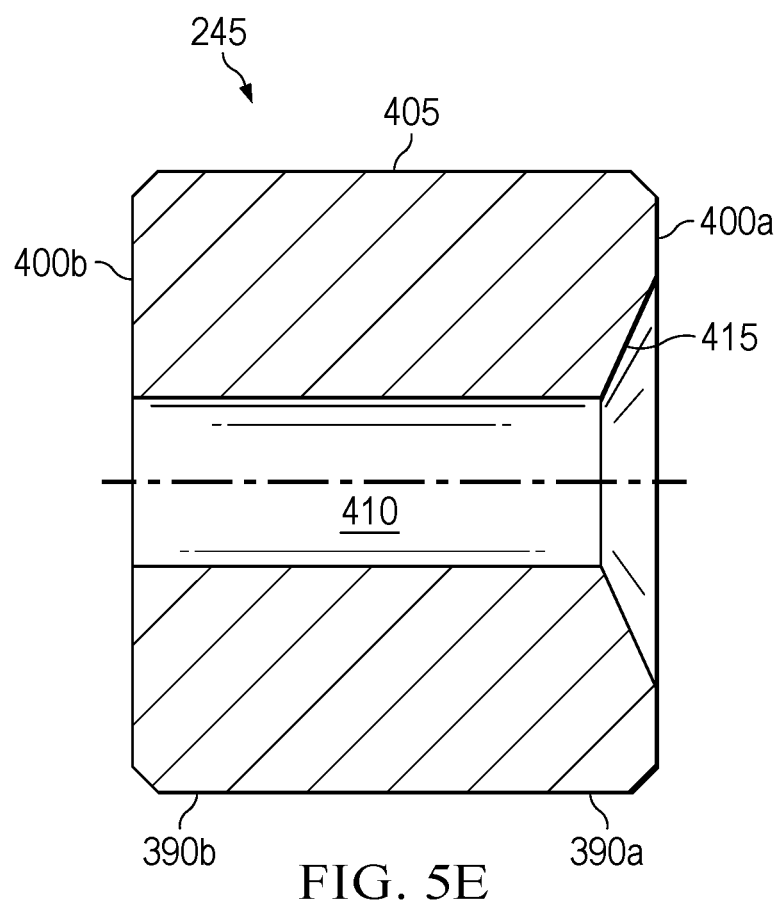
FIG. 5E is a cross-sectional view of an air chamber spacer of the nozzle of FIG. 5A, which air chamber spacer may be, include, or be part of the static charge ring shown in FIG. 5D, according to one or more embodiments.

As shown in FIG. 5E, in an embodiment, the air chamber spacer 245 defines opposing inlet and outlet end portions 390a and 390b. In one or more embodiments, the air chamber spacer 245 is, includes, or is part of the static charge ring 240. The air chamber spacer 245 includes opposing end faces 400a and 400b corresponding to the opposing inlet and outlet end portions 390a and 390b, respectively, and an external surface 405 extending between the opposing end faces 400a and 400b. An internal passageway 410 is formed axially through the air chamber spacer 245, including the end faces 400a and 400b, from the inlet end portion 390a to the outlet end portion 390b. An internal tapered surface 415 is formed into the end face 400a of the air chamber spacer 245 at the inlet end portion 390a, which internal tapered surface 415 extends around the internal passageway 410. The air chamber spacer 245 extends within the internal chamber 360 of the static charge ring 240 so that: the end face 400b of the air chamber spacer 245 extends proximate the face surface 380 of the static charge ring 240 (shown in FIG. 5A); the external surface 405 of the air chamber spacer 245 extends proximate the reduced-diameter internal surface 375 of the static charge ring 240 (shown in FIG. 5A); the internal tapered surface 415 of the air chamber spacer 245 extends proximate the tip portion 260 of the nozzle body 230 (shown in FIG. 5A); and the internal passageway 410 of the air chamber spacer 245 communicates with the internal passageway 265 of the nozzle body 230 (shown in FIG. 5A).

Figure 5F:
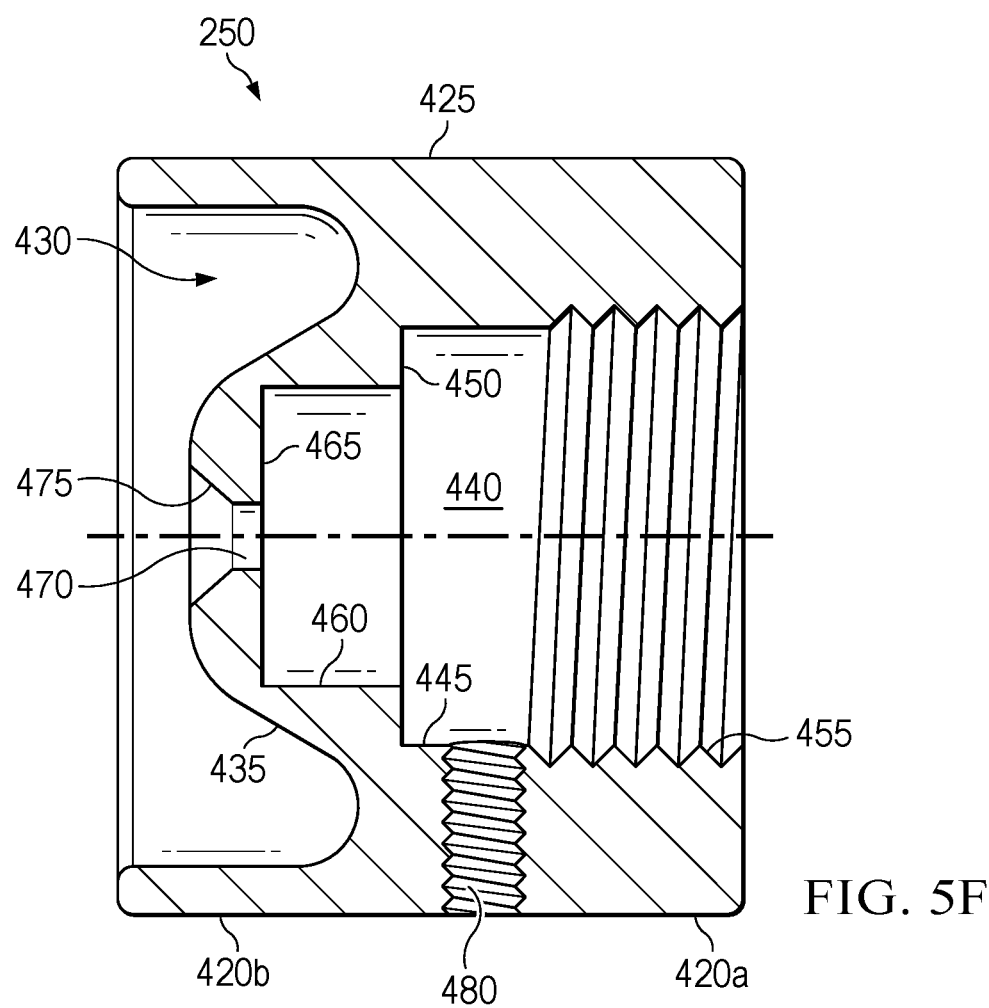
FIG. 5F is a cross-sectional view of a nozzle tip of the nozzle of FIG. 5A, according to one or more embodiments.

As shown in FIG. 5F, in an embodiment, the nozzle tip 250 defines opposing inlet and outlet end portions 420a and 420b. The nozzle tip 250 includes an external surface 425 extending from the inlet end portion 420a to the outlet end portion 420b. An annular recess 430 is formed axially into the nozzle tip 250 at the outlet end portion 420b. The annular recess 430 defines a tip portion 435 in the nozzle tip 250 at the outlet end portion 420b, which tip portion 435 is surrounded by the annular recess 430. An internal chamber 440 is formed axially into the inlet end portion 420a of the nozzle tip 250. The internal chamber 440 defines an enlarged-diameter internal surface 445 and an internal shoulder 450 in the nozzle tip 250 at the inlet end portion 420a. An internal threaded connection 455 is formed into the enlarged-diameter internal surface 445. The internal chamber 440 also defines a reduced-diameter internal surface 460 and a face surface 465 in the nozzle tip 250. An internal passageway 470 extends from the internal chamber 440 axially through the nozzle tip 250, including the face surface 465 and the tip portion 435, exiting the nozzle tip 250 at the outlet end portion 420b.

The internal threaded connection 455 of the nozzle tip 250 threadably engages the external threaded connection 350 of the static charge ring 240 (shown in FIG. 5A) so that: the face surface 465 of the nozzle tip 250 extends proximate the outlet end portion 340b of the static charge ring 240 (shown in FIG. 5A); the reduced-diameter internal surface 460 of the nozzle tip 250 extends proximate the reduced-diameter external surface 355 of the static charge ring 240 (shown in FIG. 5A); and the internal passageway 470 of the nozzle tip 250 communicates with the internal passageway 385 of the static charge ring 240. An internal tapered surface 475 is formed into the tip portion 435 of the nozzle tip 250, opposite the internal chamber 440, which internal tapered surface 475 extends around the internal passageway 470. An internal passageway 480 is formed radially from the internal chamber 440 through the nozzle tip 250, including the enlarged-diameter internal surface 445, exiting the nozzle tip 250 at the external surface 425.

Referring back to FIGS. 1A, 1D, 2A, 3A, 4, and 5A, in operation, the input device 171 is actuable to the "external" or "on-board" power mode, causing the power system 120 to supply power (from either the A/C power source or the battery 180) to component(s) of the electrostatic sprayer 100, including at least the pump 195 and the compressor 215. As a result, when the input device 171 is actuated to the "external" or "on-board" power mode, the pump 195 pressurizes spray media from the container 190 and the compressor 215 pressurizes air from the filter 210.

Actuating the input device 155 to the "off" spray mode (when the input device 171 is also actuated to the "external" or "on-board" power mode) communicates data/signal(s) from the input device 155 to the communication bus 135 via the gun connector 165, the hose 112 (including the hose connectors 170a and 170b), and the main connector 140, which data/signal(s) is/are or include data/signal(s) indicating the "off" spray mode. If the data/signal(s) indicating the "off" spray mode is/are communicated from the input device 155 to the communication bus 135, then the control system 115: receives the data/signal(s) indicating the "off" spray mode from the communication bus 135; and communicates control data/signal(s) to the solenoid valves 205a and 205b (via the communication bus 135), which control data/signal(s) cause the solenoid valves 205a and 205b to close (or remain closed). As a result, pressurized spray media from the pump 195 is not communicated to the spray gun 110.

Actuating the input device 155 to the "high" spray mode (when the input device 171 is also actuated to the "external" or "on-board" power mode) communicates data/signal(s) from the input device 155 to the communication bus 135 via the gun connector 165, the hose 112 (including the hose connectors 170a and 170b), and the main connector 140, which data/signal(s) is/are or include data/signal(s) indicating the "high" spray mode. Additionally, actuating the input device 155 to the "high" spray mode (when the input device 171 is also actuated to the "external" or "on-board" power mode), may communicate electric power from the power system 120 to the light 160, via the input device 155, causing the light 160 to illuminate an area at which the spray gun 110 is aimed. If the data/signal(s) indicating the "high" spray mode is/are communicated from the input device 155 to the communication bus 135, then the control system 115: receives the data/signal(s) indicating the high spray mode from the communication bus 135; and communicates control data/signal(s) to the solenoid valves 205a and 205b (via the communication bus 135), which control data/signal(s) cause the solenoid valve 205a to close (or remain closed) and the solenoid valve 205b to open (or remain opened). As a result, pressurized spray media from the pump 195 is communicated through the check valve 208b via the open solenoid valve 205b (and not through the closed solenoid valve 205a), through the main connector 140, through the hose 112 (including the hose connectors 170a and 170b), through the gun connector 165, through a check valve 485 (shown in FIGS. 1D and 5), and to the internal passageway 320 in the fluid electrode 235 of the nozzle 145 (e.g., at a rate of 1.5 gallons per hour).

Actuating the input device 155 to the "low" spray mode (when the input device 171 is also actuated to the "external" or "on-board" power mode) communicates data/signal(s) from the input device 155 to the communication bus 135 via the gun connector 165, the hose 112 (including the hose connectors 170a and 170b), and the main connector 140, which data/signal(s) is/are or include data/signal(s) indicating the "low" spray mode. Additionally, actuating the input device 155 to the "low" spray mode (when the input device 171 is also actuated to the "external" or "on-board" power mode), may communicate electric power from the power system 120 to the light 160, via the input device 155, causing the light 160 to illuminate an area at which the spray gun 110 is aimed. If the data/signal(s) indicating the "low" spray mode is/are communicated from the input device 155 to the communication bus 135, then the control system 115: receives the data/signal(s) indicating the "low" spray mode from the communication bus 135; and communicates control data/signal(s) to the solenoid valves 205a and 205b (via the communication bus 135), which control data/signal(s) cause the solenoid valve 205a to open (or remain open) and the solenoid valve 205b to close (or remain closed). As a result, pressurized spray media from the pump 195 is communicated through the restrictor 206 and the check valve 208a via the open solenoid valve 205a (and not through the closed solenoid valve 205b), through the main connector 140, through the hose 112 (including the hose connectors 170a and 170b), through the gun connector 165, through a check valve 485 (shown in FIGS. 1D and 5), and to the internal passageway 320 in the fluid electrode 235 of the nozzle 145 (e.g., at a rate of 0.75 gallons per hour).

In addition, or instead, the data/signal(s) indicating the off, low, or high spray modes may be communicated from the input device 155 directly to the solenoid valves 205a and 205b via the communication bus 135.

Furthermore, pressurized air from the compressor 215 is communicated through the radiator 220, through the main connector 140, through the hose 112 (including the hose connectors 170a and 170b), through the gun connector 165, and to the internal passageway 305 in the nozzle body 230 of the nozzle 145. The fans 225a and 225b receive control data/signal(s) from the communication bus 135, causing the fans 225a and 225b to move cooling air through the radiator 220 (and through a compartment in which the compressor 215 is contained) to cool the pressurized air also flowing through the radiator 220 (and to cool the compressor 215 by removing heat from the compartment).

As shown in FIG. 5A, the pressurized spray media passes through the internal passageway 320 in the fluid electrode 235 of the nozzle 145, through the internal passageway 265 in the nozzle body 230, and exits from the tip portion 260 into the internal passageway 410 of the air chamber spacer 245, as indicated by arrow 490a. Moreover, the pressurized air passes through the internal passageway 305 of the nozzle body 230, as indicated by arrow 490b, through the annular chamber 290, and enters around the tip portion 260 and past the internal tapered surface 415 of the air chamber spacer 245 into the internal passageway 410, as indicated by arrows 490c, where the pressurized air atomizes the pressurized spray media. The atomized spray media then exits the nozzle 145 through the internal passageway 385 of the static charge ring 240 and the internal passageway 470 of the nozzle tip 250, as indicate by arrows 490d.

Actuating the input device 155 to the "on" electrostatic charge mode (when the input device 155 is also actuated to the "high" or "low" spray mode and the input device 171 is also actuated to the "external" or "on-board" power mode) communicates data/signal(s) from the input device 155 to the communication bus 135 via the gun connector 165, the hose 112 (including the hose connectors 170a and 170b), and the main connector 140, which data/signal(s) is/are or include data/signal(s) indicating the "on" electrostatic charge mode. If the data/signal(s) indicating the "on" electrostatic charge mode is/are communicated from the input device 155 to the communication bus 135, then the control system 115: receives the data/signal(s) indicating the "on" electrostatic charge mode from the communication bus 135; and communicates control data/signal(s) to the generator 150 (via the communication bus 135, the main connector 140, the hose 112 (including the hose connectors 170a and 170b), and the gun connector 165), causing the generator 150 to communicate electrostatic charges to the nozzle 145. More particularly, as shown in FIG. 5A, the generator 150 communicates an electrostatic charge to the fluid electrode 235 of the nozzle 145, as indicated by arrow 495a, to electrostatically charge the pressurized spray media passing through the internal passageway 320 in the fluid electrode 235 of the nozzle 145, as indicated by the arrow 490a (i.e., the generator 150 pre-charges the spray media in the fluid electrode 235). Additionally, the generator 150 communicates another electrostatic charge to the static charge ring 240 of the nozzle 145, as indicated by arrow 495b, to electrostatically charge: the pressurized air passing through the nozzle 145, as indicated by the arrows 490b and 490c (i.e., the generator 150 pre-charges the pressurized air passing through the nozzle 145); and/or the atomized spray media exiting the nozzle 145, as indicated by the arrows 490d.

In one or more embodiments, electrostatically pre-charging the spray media in the fluid electrode 235 causes the atomized and electrostatically charged spray media to more completely wrap around or encapsulate any object(s) at which the spray gun 110 is/are aimed. In addition, or instead, electrostatically pre-charging the pressurized air passing through the nozzle 145 causes the atomized and electrostatically charged spray media to more completely wrap around or encapsulate any object(s) at which the spray gun 110 is/are aimed. In addition, or instead, electrostatically charging the atomized spray media exiting the nozzle 145 causes the atomized and electrostatically charged spray media to more completely wrap around or encapsulate any object(s) at which the spray gun 110 is/are aimed.

Finally, actuating the input device 155 to the "off" electrostatic charge mode (when the input device 155 is also actuated to the "high" or "low" spray mode and the input device 171 is also actuated to the "external" or "on-board" power mode) communicates data/signal(s) from the input device 155 to the communication bus 135 via the gun connector 165, the hose 112 (including the hose connectors 170a and 170b), and the main connector 140, which data/signal(s) is/are or include data/signal(s) indicating the "off" electrostatic charge mode. If the data/signal(s) indicating the "off" electrostatic charge mode is/are communicated from the input device 155 to the communication bus 135, then the control system 115: receives the data/signal(s) indicating the "off" electrostatic charge mode from the communication bus 135; and communicates control data/signal(s) to the generator 150 (via the communication bus 135, the main connector 140, the hose 112 (including the hose connectors 170a and 170b), and the gun connector 165), causing the generator 150 not to communicate electrostatic charges to the nozzle 145. In one or more embodiments, this ability to turn the electrostatics off permits safe usage of the electrostatic sprayer 100 around sparks or flames.

Figure 6A:
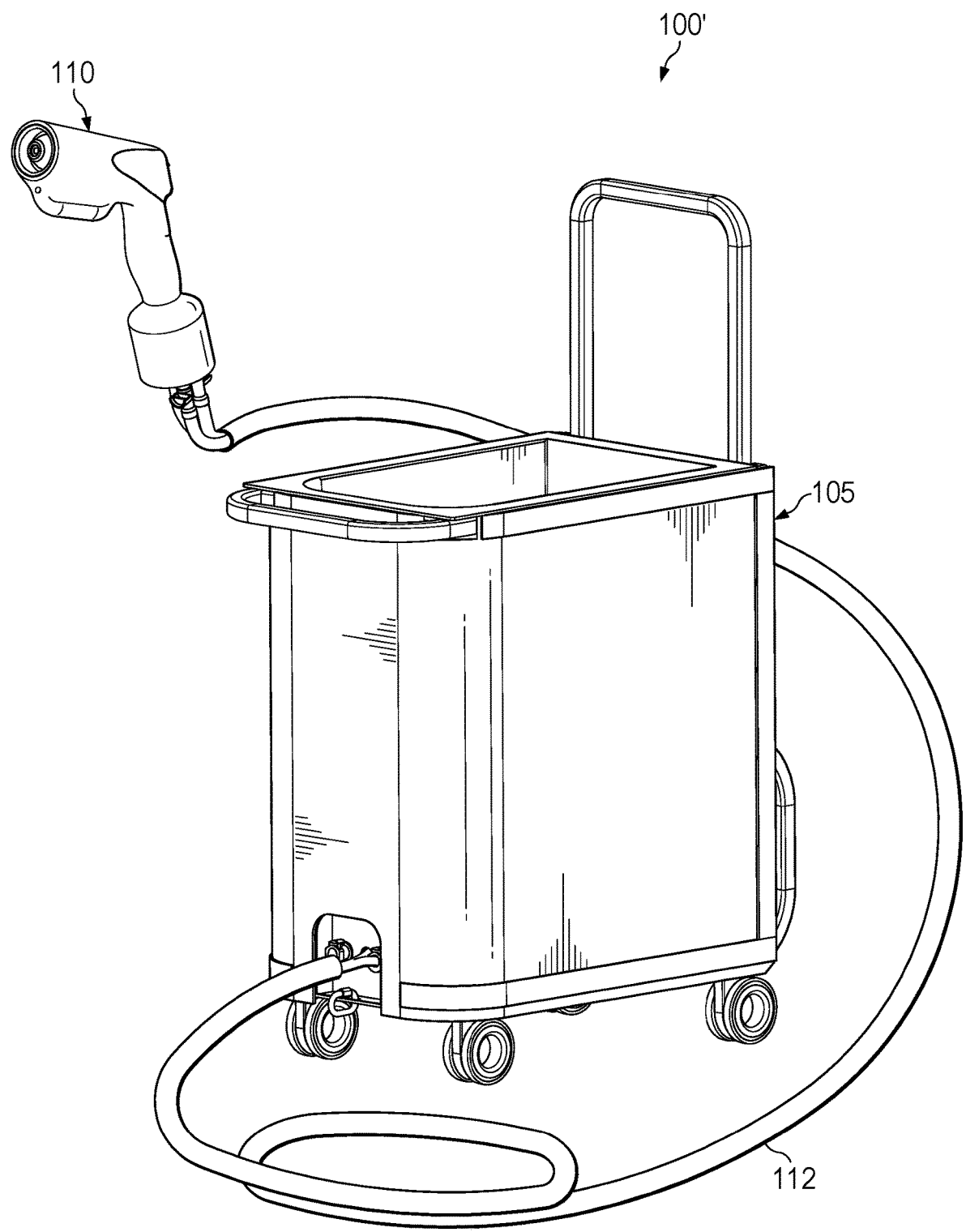
FIG. 6A is a perspective view of an electrostatic sprayer, including a main unit, a hose, and a spray gun, according to one or more embodiments.
Figure 6B:
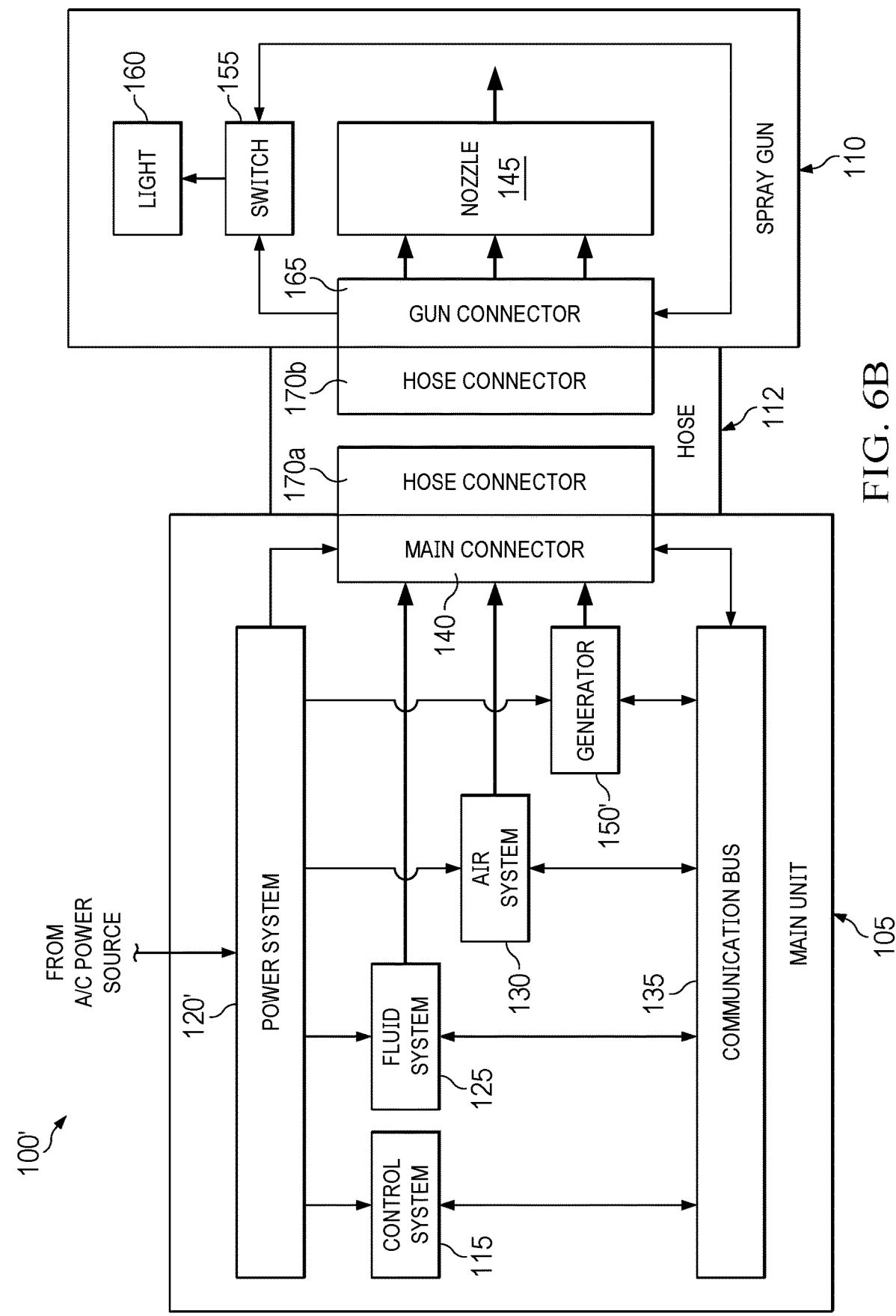
FIG. 6B is a diagrammatic illustration of the electrostatic sprayer of FIG. 6A, according to one or more embodiments.

Referring to FIGS. 6A and 6B, in an embodiment, an electrostatic sprayer is generally referred to by the reference numeral 100'. The electrostatic sprayer 100' includes several components/features that are substantially identical to corresponding components/features of the electrostatic sprayer 100, which substantially identical components/features are given the same reference numerals. However, the generator 150 is omitted from the spray gun 110 of the electrostatic sprayer 100', and is replaced with a generator 150' in the main unit 105. In one or more embodiments, the generator 150' is a negative ion generator. The electrostatic sprayer 100' is engineered to provide the ideal balance of electrostatic charge, flow rate, and spray pattern to maximize surface coverage and consistency while minimizing waste. The generator 150' may be internally grounded in the main unit 105 so the electrical charge to the spray droplets is consistent and effective in attaching to the target surfaces, as will be described in further detail below.

Additionally, the power system 120 may be omitted from the main unit 105 of the electrostatic sprayer 100', and replaced with a power system 120' in the main unit 105. The power system 120' is connected to, and communicates electric power to, the generator 150', which generator 150', in turn, is connected to, and receives the electric power from, the power system 120'. The communication bus 135 is also connected to, and communicates data/signal(s) to/from, the generator 150', which generator 150', in turn, is connected to, and communicates the data/signal(s) to/from, the communication bus 135. The generator 150' is also connected to, and communicates electrostatic charge(s) via, the main connector 140, which main connector 140, in turn, is connected to, and receives the electrostatic charge(s) from, the generator 150'. The nozzle 145 is connected to, and receives the electrostatic charge(s) (from the generator 150') via the gun connector 165 (in addition to the main connector 140 and the hose 112), which gun connector, in turn, is connected to, and communicates the electrostatic charge(s) to (from the generator 150') to the nozzle 145. As a result, in the electrostatic sprayer 100', the electrostatic charge(s) (from the generator 150') are communicated from the main unit 105 to the nozzle 145 of the spray gun 110 via the hose 112.

Figure 7:
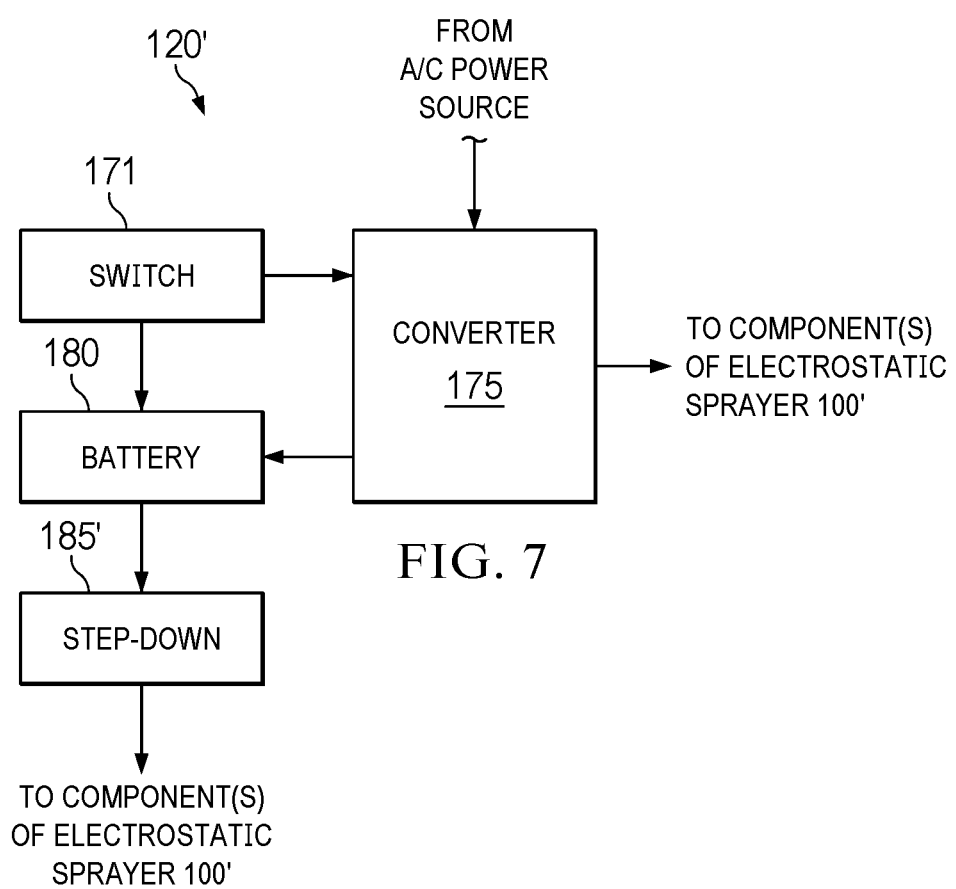
FIG. 7 is a diagrammatic illustration of a power system of the electrostatic sprayer of FIG. 6B, according to one or more embodiments.

Referring to FIG. 7, with continuing reference to FIG. 6B, in an embodiment, the power system 120' includes several components/features that are substantially identical to corresponding components/features of the power system 120, which substantially identical components/features are given the same reference numerals. However, the step-down 185a and the step-down 185b are omitted from the power system 120', and are replaced with a single step-down 185'. The battery 180 is connected to, and communicates electric power to, the step-down 185', which step-down 185', in turn, is connected to, and receives the electric power from, the battery 180. In one or more embodiments, the step-down 185' converts 48V D/C electric power from the battery 180 into 24V D/C electric power. The step-down 185' also communicates electric power to other component(s) of the electrostatic sprayer 100'. Actuating the input device 171 to the "external" power mode causes the power system 120' to supply power from the A/C power source to component(s) of the electrostatic sprayer 100', via the converter 175, as previously described above in connection with the electrostatic sprayer 100. Alternatively, actuating the input device 171 to the "on-board" power mode causes the power system 120' to supply power from the battery 180 to component(s) of the electrostatic sprayer 100', via the step-down 185', as previously described above in connection with the step-down 185a of the electrostatic sprayer 100.

The operation of the electrostatic sprayer 100' is substantially identical to that of the electrostatic sprayer 100 described above, except with respect to those differences described above in connection with the generator 150' and the power system 120', and, therefore, will not be described in further detail.

Figure 8A:
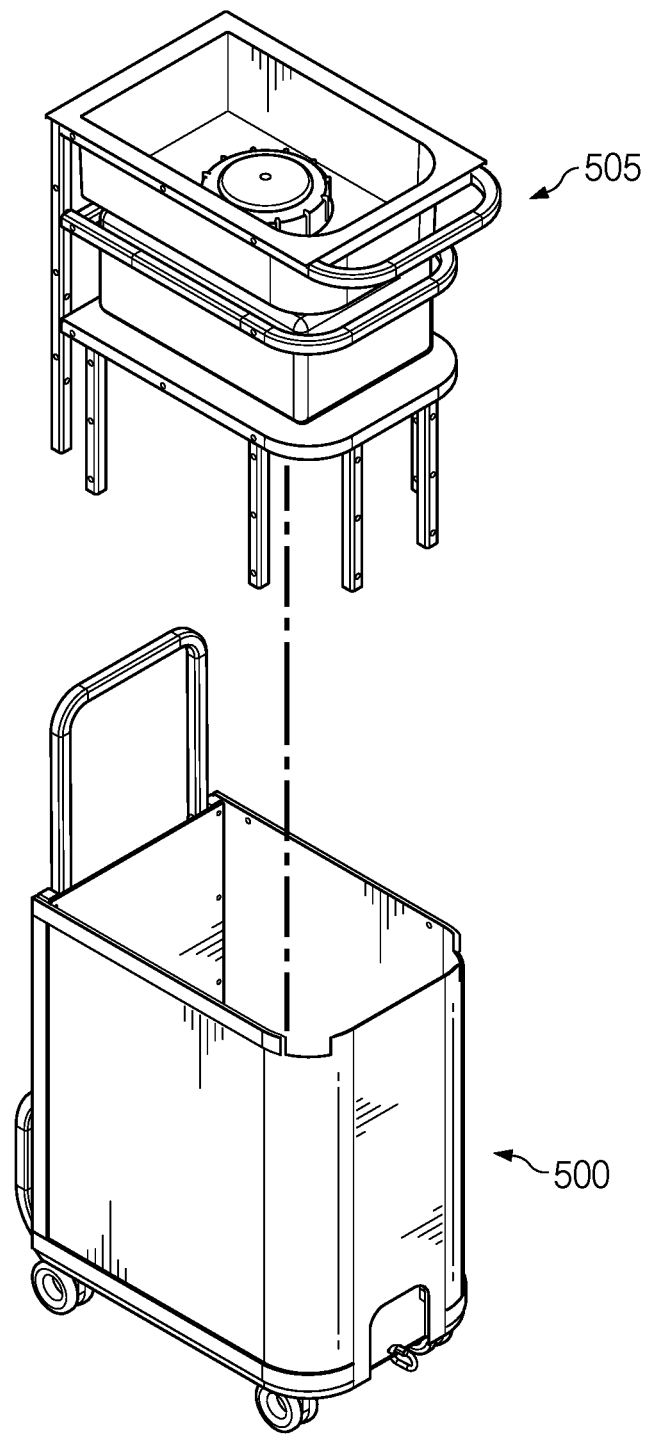
FIG. 8A is an exploded perspective view of the main unit of the electrostatic sprayer of FIG. 6A, according to one or more embodiments.
Figure 8B:
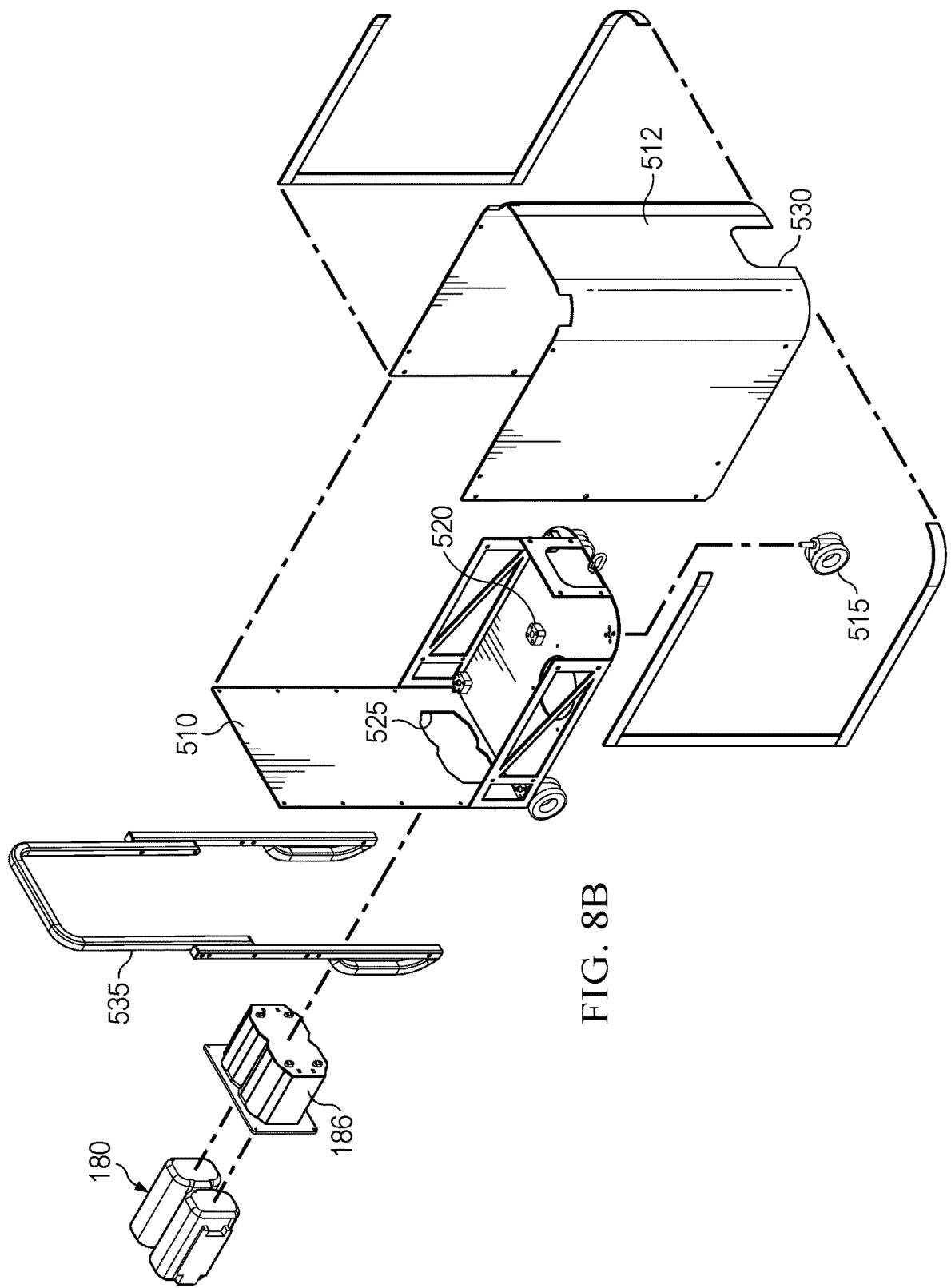
FIG. 8B is an exploded perspective view of a chassis assembly of the main unit of FIG. 8A, according to one or more embodiments.
Figure 8C:
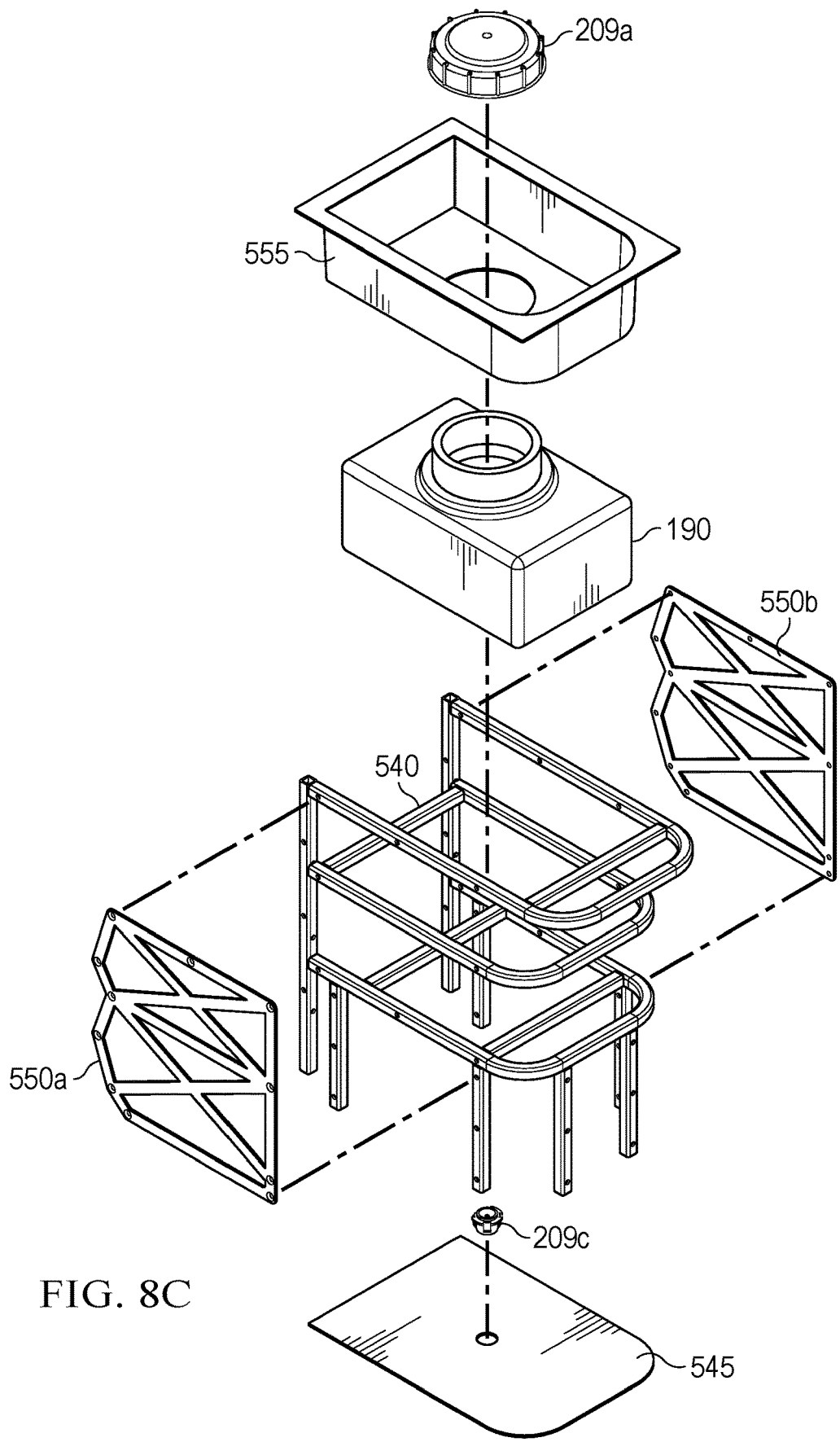
FIG. 8C is an exploded view of a frame assembly of the main unit of FIG. 8A, according to one or more embodiments.

Referring to FIGS. 8A through 8C, with continuing reference to FIGS. 6A, 6B, and 7, in an embodiment, the main unit 105 of the electrostatic sprayer 100' includes a chassis assembly 500 and a frame assembly 505. As shown in FIG. 8B, the chassis assembly 500 includes a main chassis 510 and a cover 512. A plurality of wheels 515 (e.g., 70 mm easy-roll, heavy duty wheels, which provide a smooth, silent roll ideal for both hard and soft surfaces) are each connected to the main chassis via a wheel block 520. In one or more embodiments, the generator 150' is internally grounded in the main unit 105 via one or more of the wheels 515 (e.g., vie the corresponding wheel block(s)). For example, the one or more wheels 515 via which the generator 150' is internally grounded in the main unit 105 may be or include a partially conductive and/or anti-static material (e.g., a conductive strip) that contacts ground when the electrostatic sprayer 100' is in use (to prevent, or at least reduce, the risk of shock to the user).

An opening 525 (e.g., in the main chassis 510) houses the connection terminals 186 to provide external access for the user to change the batteries 180. Similarly, an opening 530 (e.g., in the cover 512) houses the main connector 140 (shown in FIG. 8D) to provide external access to connect and disconnect the hose 112. The chassis assembly also includes a handle 535 (e.g., connected to the main chassis 510) to provide a convenient structure the user to hold on to in order to move the electrostatic sprayer 100' around. As shown in FIG. 8C, the frame assembly 505 includes a frame 540, a shield 545, a pair of trusses 550a and 550b, and a tray 555. The spray gun 110 and the hose 112 may be coiled and stored in the tray 555 when not in use. The shield 545 fits into the frame 540, houses the auto feeder receptacle 209c, and shields the container 190 (e.g., easily-removable, 2.5 gallon container including quick-release connections for rapid refill and cleaning) from other components/features of the electrostatic sprayer 100'. The trusses 550a and 550b connect to opposing sides of the frame 540 to provide structural support. The container 190 includes the auto feeder valve 209b (not visible in FIG. 8C; shown in FIG. 9E), which mates with the auto feeder receptacle 209c. The removable cap 209a matingly engages the container 190, providing the user with access for refilling.

Figure 8D:
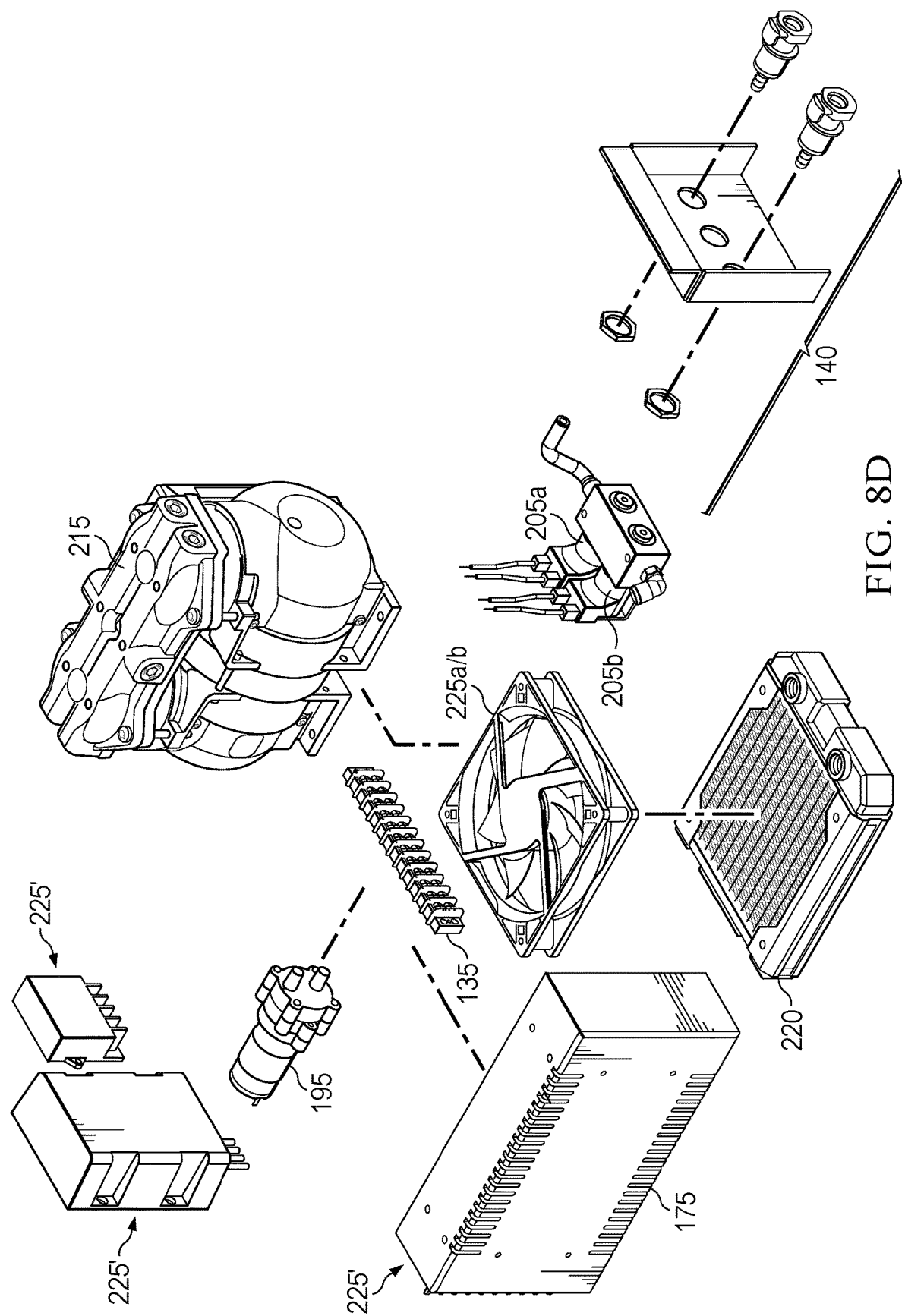
FIG. 8D is an exploded view of various components of the electrostatic sprayer housed within the chassis assembly of FIG. 8B, the frame assembly of FIG. 8C, or both, according to one or more embodiments.

Turning additionally to FIG. 8D, with continuing reference to FIGS. 8A through 8C, in an embodiment, the communication bus 135, the main connector 140, the power system 225' (including the converter 175), the pump 195, the solenoid valves 205a and 205b, the compressor 215, the radiator 220, and the fan 225a/b are each housed within the chassis assembly 500, the frame assembly 505, or both. In addition to, or instead of, utilizing the solenoid valve 205a and 205b as described herein to vary a flow of the fluid media exiting the spray gun 110, the pump 195 may be or include a variable speed pump that provides varying flow to the spray gun 110 in response to data/signal(s) received from the input device 155, a valve (e.g., electronic, vacuum, or pressure assisted) in the main unit 105 (e.g., the valve 205a, the valve 205b, or another valve) may be throttled to vary flow to the spray gun 110 in response to data/signal(s) received from the input device 155, another valve in the spray gun (e.g., a knob-actuated valve) may be throttled (e.g., manually by the user), the like, or any combination thereof.

Figure 9A:
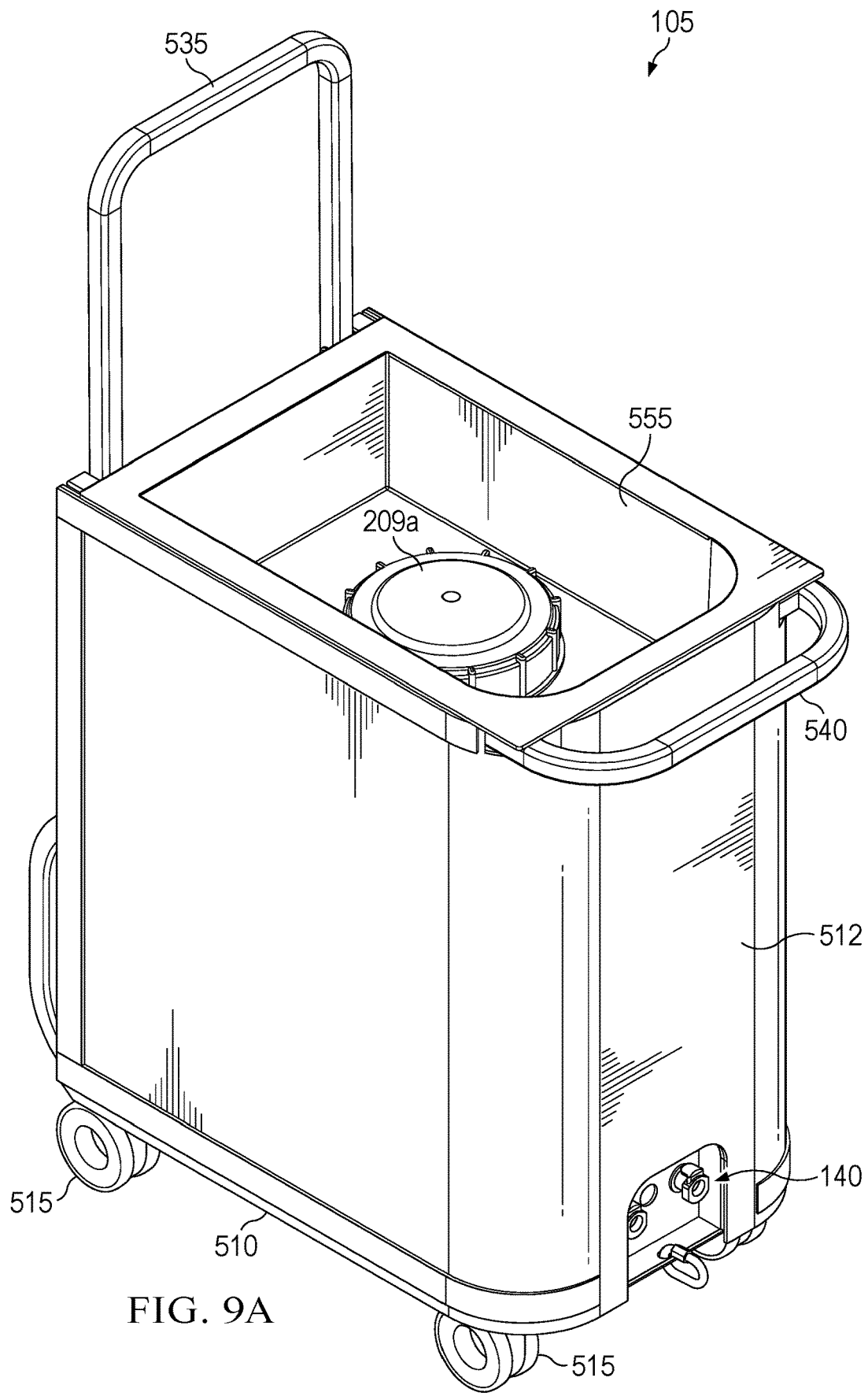
FIG. 9A is a perspective view of the main unit of the electrostatic sprayer of FIG. 6A, according to one or more embodiments.
Figure 9B:
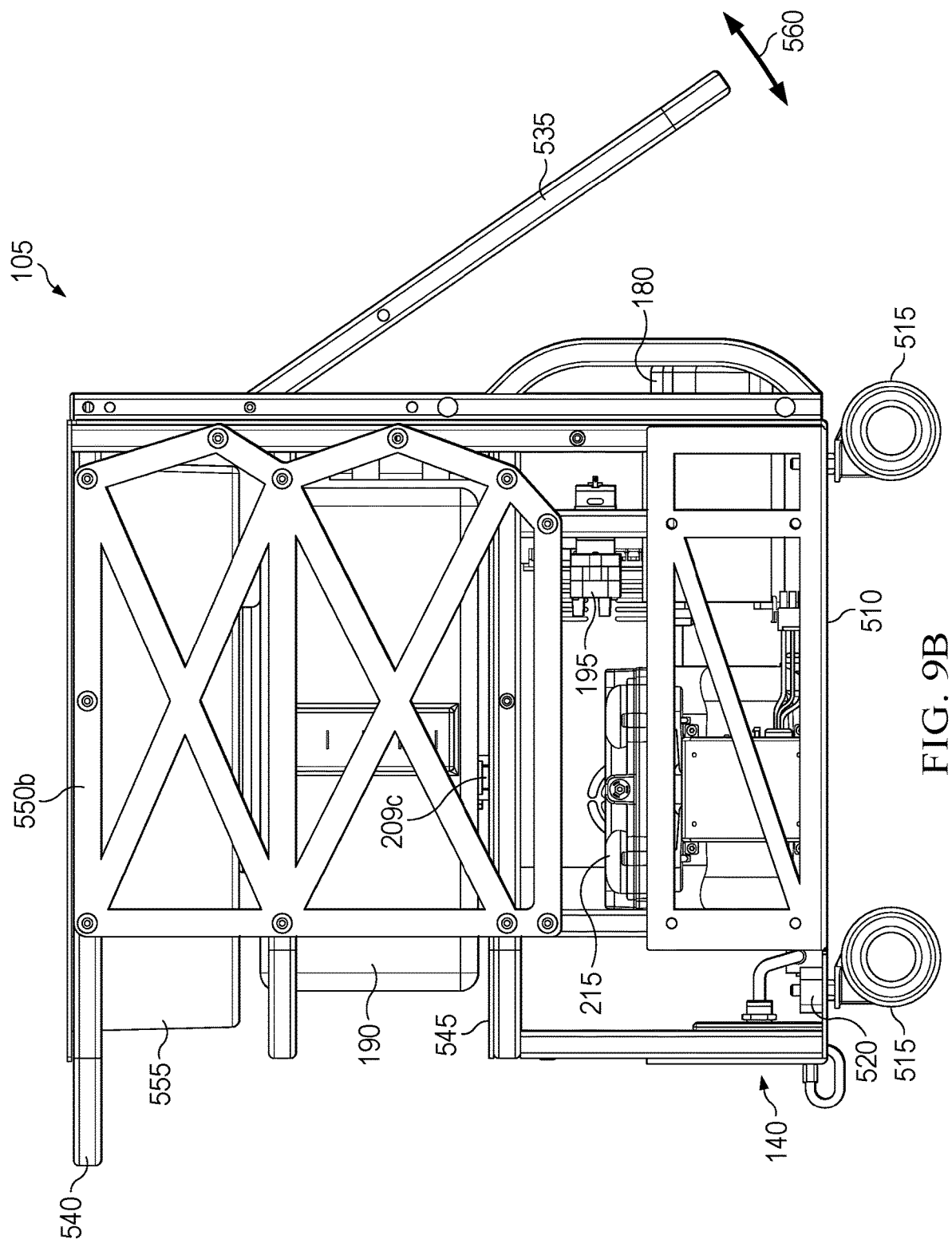
FIG. 9B is a first elevational view of the main unit of FIG. 9A with a cover of the electrostatic sprayer removed, according to one or more embodiments.
Figure 9C:
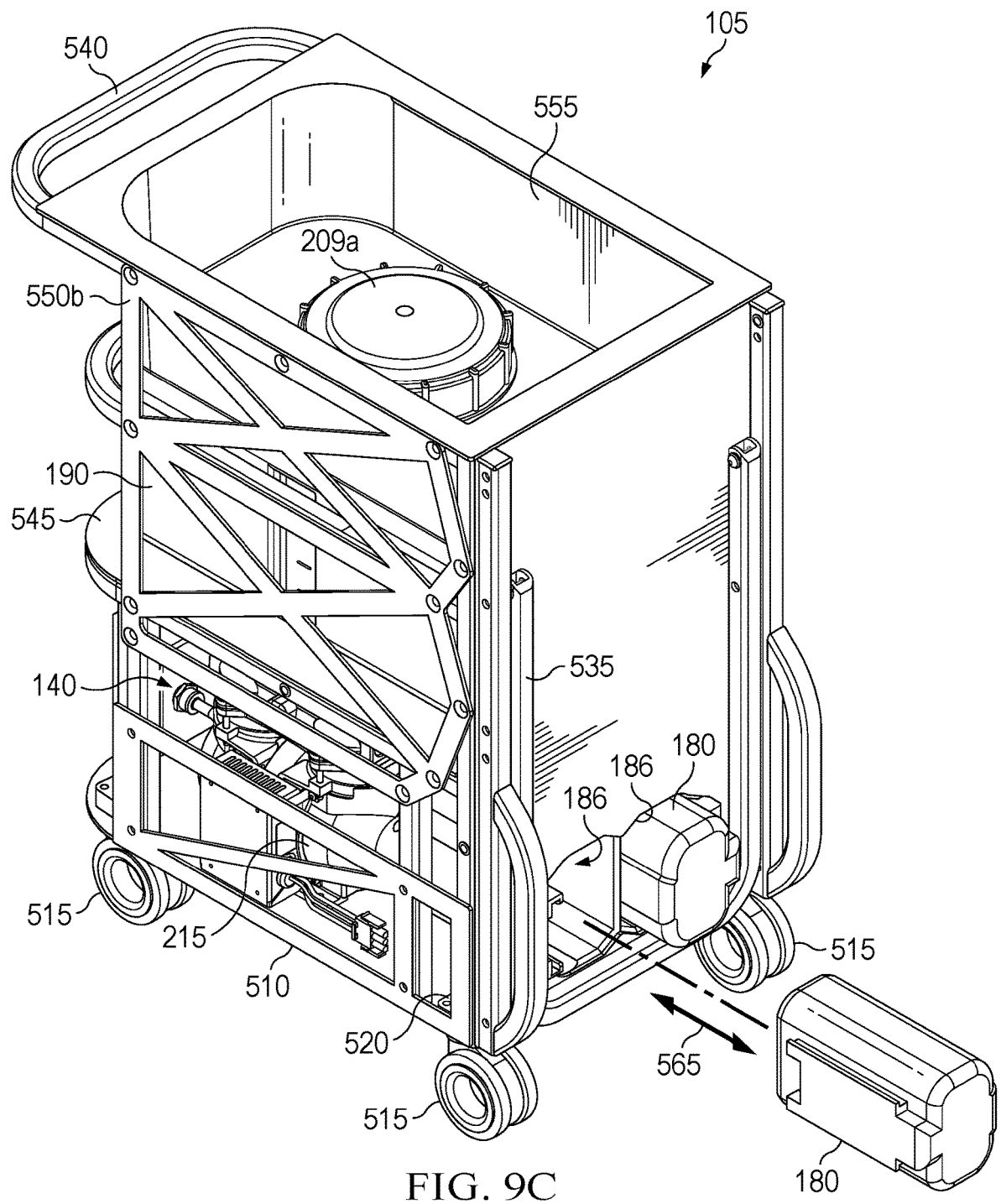
FIG. 9C is a perspective view of the main unit of the electrostatic sprayer of FIG. 9B, according to one or more embodiments.
Figure 9D:
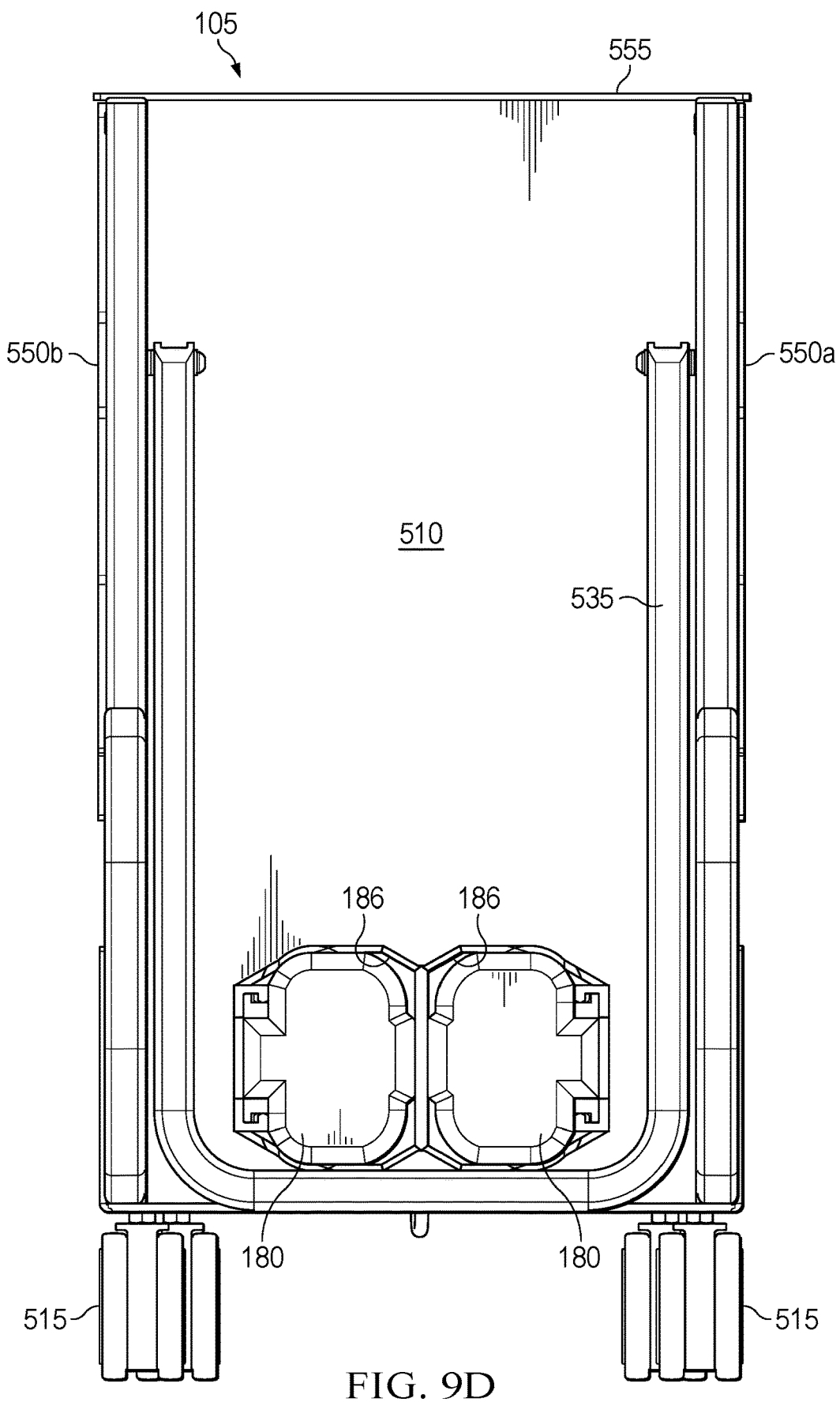
FIG. 9D is a second elevational view of the main unit of the electrostatic sprayer of FIG. 9B, according to one or more embodiments.
Figure 9E:
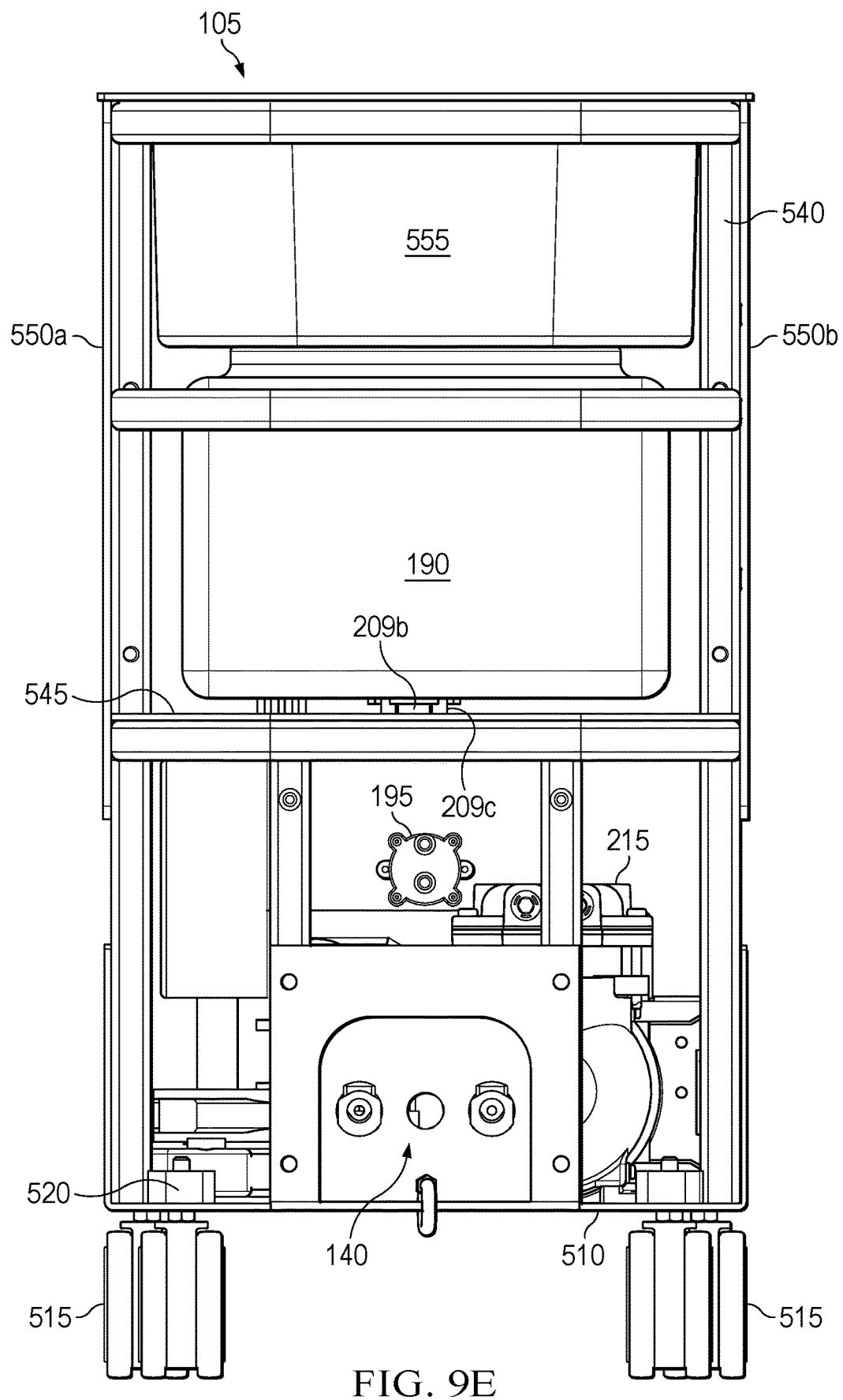
FIG. 9E is a third elevational view of the main unit of the electrostatic sprayer of FIG. 9B, according to one or more embodiments.
Figure 9F:
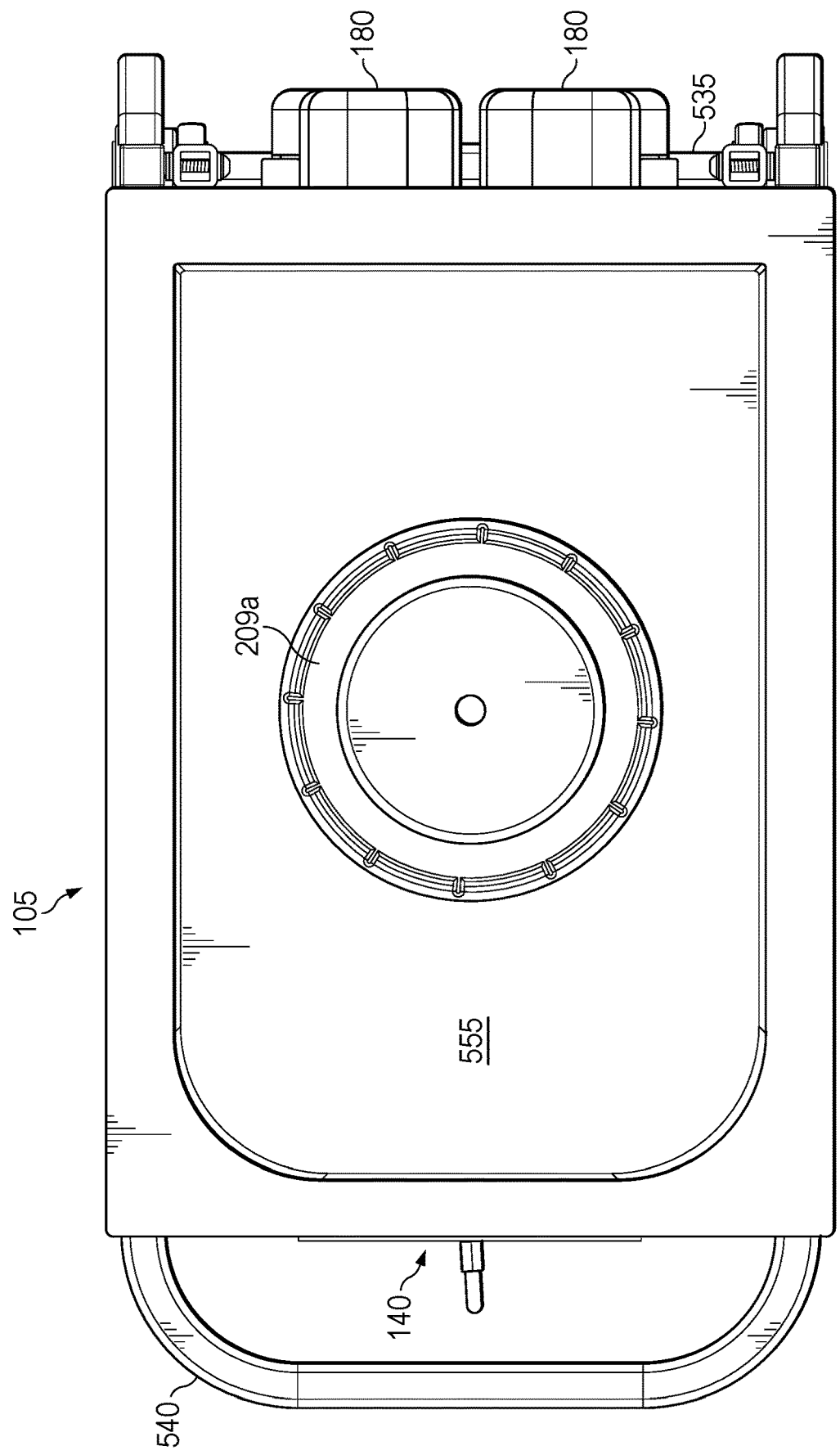
FIG. 9F is a top plan view of the main unit of the electrostatic sprayer of FIG. 9B, according to one or more embodiments.

Referring to FIGS. 9A through 9F, with continuing reference to FIGS. 8A through 8D, the main unit 105 of the electrostatic sprayer 100' is illustrated in an assembled state (with the cover removed in FIGS. 9B through 9F for better visibility of the internal components/features). As shown in FIGS. 9B, 9C, 9D, and 9F, the handle 535 is pivotable (as indicated by arrow 560 in FIG. 9B) to a stowed position (shown in FIGS. 9C, 9D, and 9F). As shown in FIG. 9C, the batteries 180 are externally removable from, and replaceable to, the connection terminals 186 (as indicated by arrow 565). The connection terminals 186 provide external ports for rapid changing of the batteries 180 (e.g., rechargeable batteries), which allows for continuous operation of the electrostatic sprayer 100'.

Figure 10A:
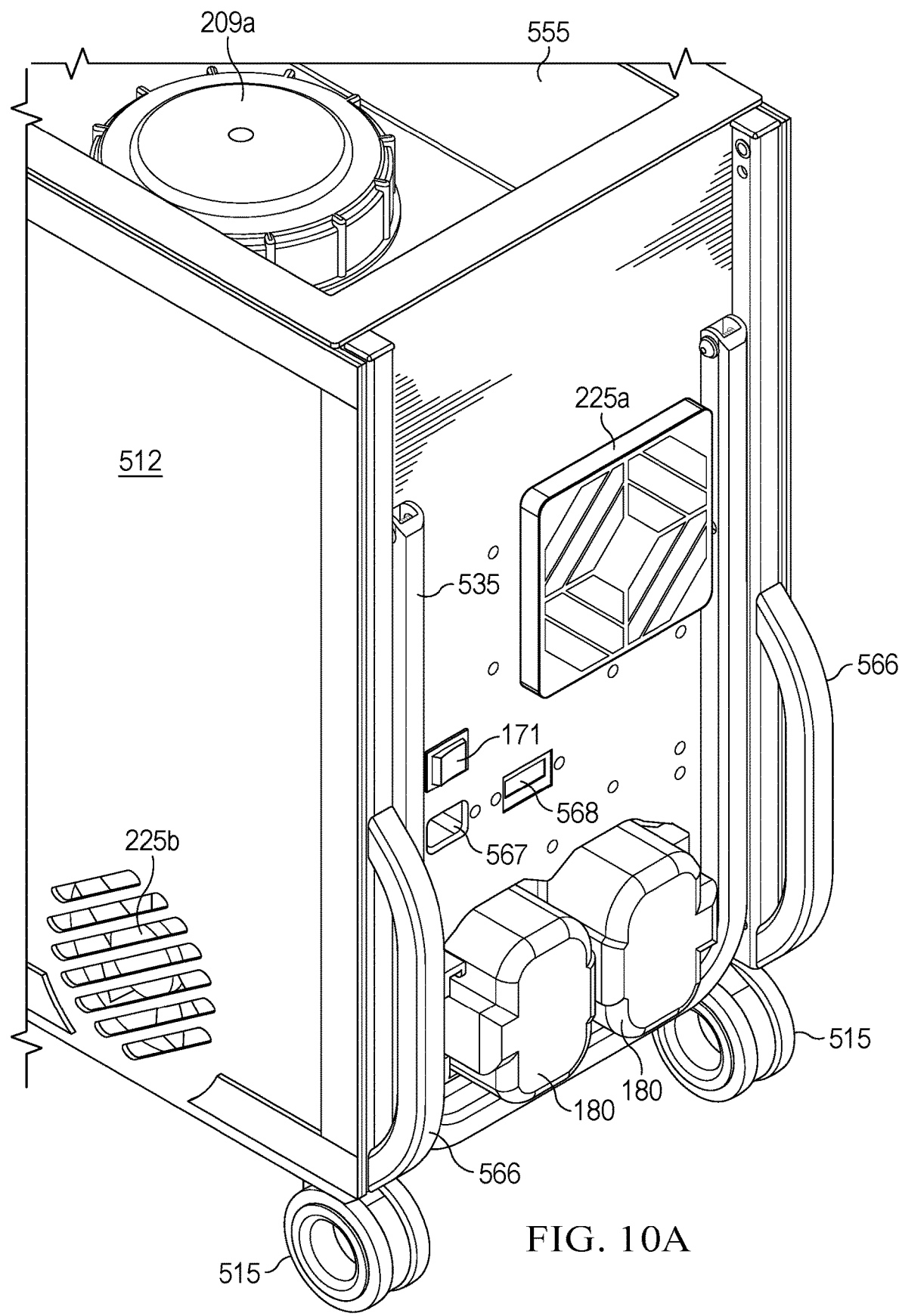
FIG. 10A is an enlarged perspective view of a portion of the main unit of the electrostatic sprayer from a viewing angle similar to that shown in FIG. 9C, according to one or more alternative embodiments.
Figure 10B:
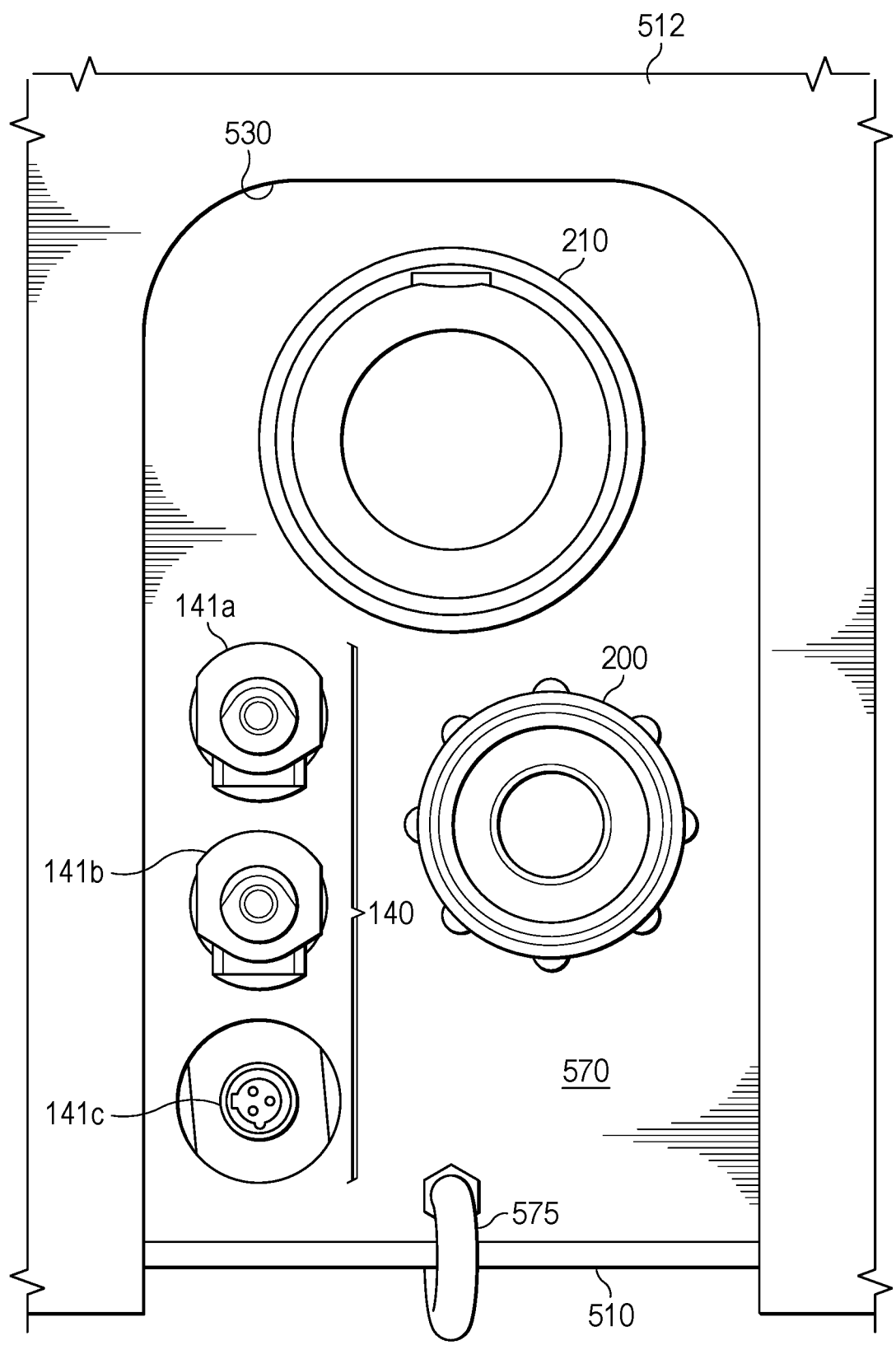
FIG. 10B is an enlarged elevational view of a portion of the main unit of the electrostatic sprayer from a viewing angle similar to that shown in FIG. 9E, according to one or more alternative embodiments.

Referring to FIGS. 10A and 10B, in an embodiment, various components of the electrostatic sprayer 100' are mounted to, and externally accessible on, the main unit 105. For example, as shown in FIG. 10A, the switch 171, a port 567, and a display unit 568 can be mounted to, and externally accessible on, the main unit 105. In one or more embodiments, the port 567 is or includes an external power port for connection of the main unit 105 to the power source spaced apart from the main unit 105. In one or more embodiments, the display unit 568 is or includes a flow meter that displays a flow of the spray media exiting the nozzle 145 of the spray gun 110 to the user. In addition, or instead, the display unit may be or include an hour meter that displays usage (e.g., total, session, etc.) of the electrostatic sprayer 100' to the user. Optionally, the electrostatic sprayer 100' may also include an externally accessible fuse panel (not shown) mounted on the main unit 105. A pair of impact protection bars 566 protect the batteries 180 and the connection terminals 186 terminals from damage (e.g., when the main unit 105 is pulled up stairs by the user).

For another example, as shown in FIG. 10B, the main connector 140 may be or include a fluid connector 141a, an air connector 141b, and a power connector 141c mounted to, and externally accessible on, a front plate 570 of the main unit 105. The front plate 570 is aligned with the opening 530 in the cover 512. In addition, the filters 200 (i.e., the fluid filter) and 210 (i.e., the air filter) may be mounted to, and externally accessible on, the front plate 570 of the main unit 105. A connector 575 (e.g., a carabiner) may also be attached to the main chassis 510 of the main unit. The connector 575 provides an anchor point for a line (not shown) connected to the hose 112, which line prevents, or at least reduces, damage to the main connector 140 and/or the hose connector 170a when a user pulls on the hose 112 during use.

Figure 11A:
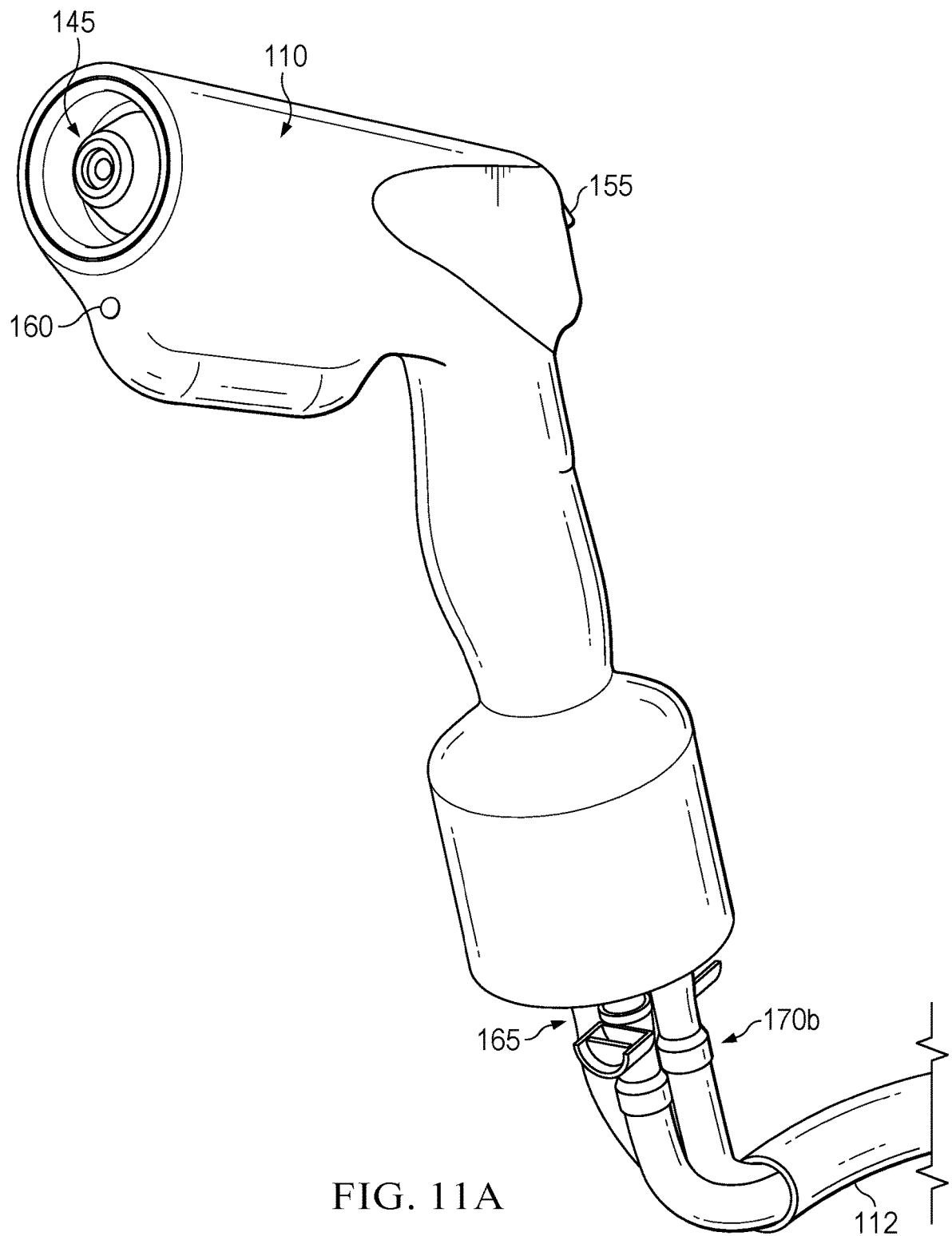
FIG. 11A is a perspective view of the spray gun of the electrostatic sprayer of FIG. 6A, according to one or more embodiments.
Figure 11B:
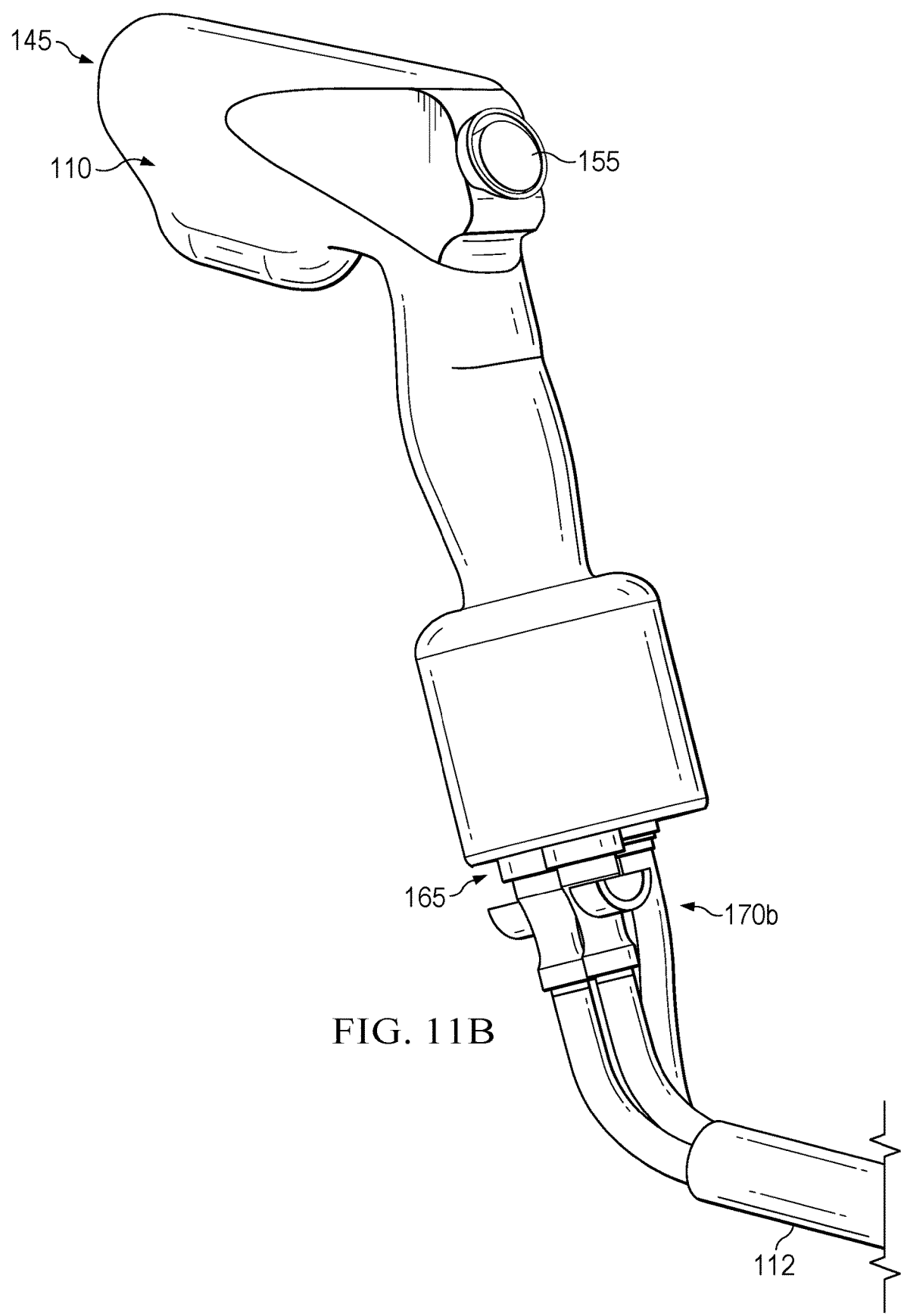
FIG. 11B is another perspective view of the spray gun of the electrostatic sprayer of FIG. 6A, according to one or more embodiments.

Referring to FIGS. 11A and 11B, the spray gun 110 of the electrostatic sprayer 100' is also illustrated in an assembled state. As discussed above the input device 155 is actuable between "off," "high," and "low" spray modes. For example, the input device 155 may be actuable to vary the amount of spray continuously by degree within a range including the low spray mode and the high spray mode. As shown in FIGS. 11A and 11B, the spray gun includes an ergonomic and anti-fatigue grip for increased productivity.

An electrostatic sprayer has been disclosed according to a first aspect. The electrostatic sprayer according to the first aspect generally includes: a spray gun including a nozzle, the spray gun being adapted to combine, at the nozzle, pressurized spray media and pressurized air into an atomized mixture; and a generator adapted to electrostatically charge, at the nozzle: (a) the pressurized spray media; or the pressurized air; or both the pressurized spray media and the pressurized air; and (b) the atomized mixture. In one or more embodiments, the electrostatic sprayer according to the first aspect further includes: a hose adapted to be connected to the spray gun to communicate the pressurized spray media and the pressurized air to the spray gun; and a main unit to which the hose is further adapted to be connected to communicate the pressurized spray media and the pressurized air to the spray gun. In one or more embodiments: the spray gun further includes an input device actuable by a user; the hose is further adapted to communicate data/signal(s) from the input device to the main unit; and a flow of the pressurized spray media communicated to the spray gun via the hose is varied based on the data/signal(s) received at the main unit from the input device. In one or more embodiments, the main unit has: a first power mode, in which a battery received in the main unit powers one or more components of the electrostatic sprayer; and a second power mode, in which a power source spaced apart from the main unit powers the one or more components of the electrostatic sprayer. In one or more embodiments, the main unit further includes: a connection terminal via which the battery is externally detachable from, and connectable to, the main unit to power, in the first power mode, the one or more components of the electrostatic sprayer. In one or more embodiments: the spray gun further includes a gun connector; the main unit includes a main connector; and the hose includes first and second hose connectors, the first hose connector being or including a first quick-connect fitting adapted to be detachably connected to the gun connector, and the second hose connector being or including a second quick-connect fitting adapted to be detachably connected to the main connector. In one or more embodiments: the generator is contained in the main unit; and the hose is further adapted to communicate electrostatic charge(s) from the generator to the spray gun. In one or more embodiments: the spray gun further includes a light and an input device; the hose is further adapted to communicate D/C power from the main unit to the spray gun; and the input device is adapted to receive the D/C power from the hose, and is actuable by a user to relay the D/C power to the light. In one or more embodiments, the main unit includes: a container containing the spray media, the container being detachable from the main unit and including a valve adapted to close when the container is detached from the main unit, and to open when the container is connected to main unit; and a pump to which the container is adapted to communicate the spray media, via the valve, when the container is attached to the main unit, the pump being adapted to pressurize the spray media. In one or more embodiments, the nozzle includes: a nozzle body defining opposing inlet and outlet end portions, a first internal passageway along which the pressurized spray media is communicated, and a second internal passageway along which the pressurized air is communicated; a fluid electrode via which the pressurized spray media is communicated to the first internal passageway at the inlet end portion of the nozzle body, and to which the generator communicates electrostatic charge(s) to electrostatically charge the pressurized spray media; and a static charge ring via which the atomized mixture is discharged from the nozzle at the outlet end portion of the nozzle body, and to which the generator communicates electrostatic charge(s) to electrostatically charge the atomized mixture.

An electrostatic sprayer has also been disclosed according to a second aspect. The electrostatic sprayer according to the second aspect generally includes: a spray gun including a nozzle, the spray gun being adapted to combine, at the nozzle, pressurized spray media and pressurized air into an atomized mixture; a hose adapted to be connected to the spray gun to communicate the pressurized spray media and the pressurized air to the spray gun; and a main unit to which the hose is further adapted to be connected to communicate the pressurized spray media and the pressurized air to the spray gun; wherein: the spray gun further includes an input device actuable by a user; the hose is further adapted to communicate data/signal(s) from the input device to the main unit; and a flow of the pressurized spray media communicated to the spray gun via the hose is varied based on the data-signal(s) received at the main unit from the input device. In one or more embodiments, the main unit has: a first power mode, in which a battery received in the main unit powers one or more components of the electrostatic sprayer; and a second power mode, in which a power source spaced apart from the main unit powers the one or more components of the electrostatic sprayer. In one or more embodiments, the main unit further includes: a connection terminal via which the battery is externally detachable from, and connectable to, the main unit to power, in the first power mode, the one or more components of the electrostatic sprayer. In one or more embodiments: the spray gun further includes a gun connector; the main unit includes a main connector; and the hose includes first and second hose connectors, the first hose connector being or including a first quick-connect fitting adapted to be detachably connected to the gun connector, and the second hose connector being or including a second quick-connect fitting adapted to be detachably connected to the main connector. In one or more embodiments: the spray gun further includes a light and an input device; the hose is further adapted to communicate D/C power from the main unit to the spray gun; and the input device is adapted to receive the D/C power from the hose, and is actuable by a user to relay the D/C power to the light. In one or more embodiments, the main unit includes: a container containing the spray media, the container being detachable from the main unit and including a valve adapted to close when the container is detached from the main unit, and to open when the container is connected to main unit; and a pump to which the container is adapted to communicate the spray media, via the valve, when the container is attached to the main unit, the pump being adapted to pressurize the spray media. In one or more embodiments: the main unit includes: a pump adapted to pressurize the spray media; and first and second valves connected in parallel to the pump; and the flow of the pressurized spray media communicated to the spray gun via the hose is varied by: opening or closing the first valve; or opening or closing the second valve; or both opening or closing the first valve and opening or closing the second valve.

An electrostatic sprayer has also been disclosed according to a third aspect. The electrostatic sprayer according to the third aspect generally includes: a spray gun including a nozzle, the spray gun being adapted to combine, at the nozzle, pressurized spray media and pressurized air into an atomized mixture; a hose adapted to be connected to the spray gun to communicate the pressurized spray media and the pressurized air to the spray gun; and a main unit to which the hose is further adapted to be connected to communicate the pressurized spray media and the pressurized air to the spray gun, the main unit having: a first power mode, in which a battery received in the main unit powers one or more components of the electrostatic sprayer; and a second power mode, in which a power source spaced apart from the main unit powers the one or more components of the electrostatic sprayer. In one or more embodiments, the main unit further includes: a connection terminal via which the battery is externally detachable from, and connectable to, the main unit to power, in the first power mode, the one or more components of the electrostatic sprayer. In one or more embodiments: the spray gun further includes a gun connector; the main unit includes a main connector; and the hose includes first and second hose connectors, the first hose connector being or including a first quick-connect fitting adapted to be detachably connected to the gun connector, and the second hose connector being or including a second quick-connect fitting adapted to be detachably connected to the main connector. In one or more embodiments: the spray gun further includes a light and an input device; the hose is further adapted to communicate D/C power from the main unit to the spray gun; and the input device is adapted to receive the D/C power from the hose, and is actuable by a user to relay the D/C power to the light. In one or more embodiments, the main unit includes: a container containing the spray media, the container being detachable from the main unit and including a valve adapted to close when the container is detached from the main unit, and to open when the container is connected to main unit; and a pump to which the container is adapted to communicate the spray media, via the valve, when the container is attached to the main unit, the pump being adapted to pressurize the spray media.

An electrostatic sprayer has also been disclosed according to a fourth aspect. The electrostatic sprayer according to the fourth aspect generally includes: a spray gun including a nozzle and a first input device actuable by a user, the spray gun being adapted to combine, at the nozzle, pressurized spray media and pressurized air into an atomized mixture; a generator adapted to electrostatically charge the atomized mixture at the nozzle; and a hose adapted to be connected to the spray gun to communicate the pressurized spray media and the pressurized air to the spray gun, and to communicate data/signal(s) from the first input device. In one or more embodiments, the electrostatic sprayer according to the fourth aspect further includes: a main unit to which the hose is further adapted to be connected to communicate the pressurized spray media and the pressurized air to the spray gun. In one or more embodiments: the hose is adapted to communicate the data/signal(s) from the first input device to the main unit; and a flow of the pressurized spray media communicated to the spray gun via the hose is varied based on the data-signal(s) received at the main unit from the first input device. In one or more embodiments, the main unit has: a first power mode, in which a battery received in the main unit powers one or more components of the electrostatic sprayer; and a second power mode, in which a power source spaced apart from the main unit powers the one or more components of the electrostatic sprayer. In one or more embodiments, the main unit further includes: a connection terminal via which the battery is externally detachable from, and connectable to, the main unit to power, in the first power mode, the one or more components of the electrostatic sprayer. In one or more embodiments: the spray gun further includes a gun connector; the main unit includes a main connector; and the hose includes first and second hose connectors, the first hose connector being or including a first quick-connect fitting adapted to be detachably connected to the gun connector, and the second hose connector being or including a second quick-connect fitting adapted to be detachably connected to the main connector. In one or more embodiments: the spray gun further includes a light and a second input device; the hose is further adapted to communicate D/C power from the main unit to the spray gun; and the second input device is adapted to receive the D/C power from the hose, and is actuable by a user to relay the D/C power to the light. In one or more embodiments, the main unit includes: a container containing the spray media, the container being detachable from the main unit and including a valve adapted to close when the container is detached from the main unit, and to open when the container is connected to main unit; and a pump to which the container is adapted to communicate the spray media, via the valve, when the container is attached to the main unit, the pump being adapted to pressurize the spray media.

It is understood that variations may be made in the foregoing without departing from the scope of the present disclosure.

In several embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several embodiments, while different steps, processes, and procedures are described as appearing as distinct acts, one or more of the steps, one or more of the processes, and/or one or more of the procedures may also be performed in different orders, simultaneously and/or sequentially. In several embodiments, the steps, processes, and/or procedures may be merged into one or more steps, processes and/or procedures.

In several embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. An electrostatic sprayer, comprising:
a spray gun comprising a nozzle, the spray gun being adapted to combine, at the nozzle, pressurized spray media and pressurized air into an atomized mixture; and
a generator adapted to electrostatically charge, at the nozzle:
(a) the pressurized spray media; or
the pressurized air; or
both the pressurized spray media and the pressurized air; and
(b) the atomized mixture,
wherein the nozzle comprises:
a nozzle body defining opposing inlet and outlet end portions, a first internal passageway extending axially through the nozzle body between the inlet and the outlet end portions and along which the pressurized spray media is communicated, and a second internal passageway along which the pressurized air is communicated, an inlet portion of the second internal passageway extending radially inward, perpendicular to the axial extension of the first internal passageway, into the nozzle body from an exterior surface of the nozzle body,
wherein the nozzle body further comprises external threads located on the exterior surface proximate the outlet end portion of the nozzle body;
a spacer positioned at the outlet end portion of the nozzle body and defining a third internal passageway along which the atomized mixture is communicated;
a static charge ring defining opposing inlet and outlet end portions and a fourth internal passageway extending axially through the static charge ring between the inlet and outlet end portions via which the atomized mixture is discharged from the spacer and to which static charge ring the generator communicates electrostatic charge(s) to electrostatically charge the atomized mixture,
wherein the static charge ring further comprises internal threads located on an interior surface proximate the inlet end portion of the static charge ring and external threads located on an exterior surface proximate the inlet end portion of the static charge ring; and
a nozzle defining a fifth internal passageway to which the atomized mixture is communicated from the fourth internal passageway of the static charge ring, and via which the atomized mixture is discharged from the nozzle,
wherein the nozzle tip further comprises internal threads located on an interior surface of the nozzle tip;
wherein the internal threads of the static charge ring threadably engage the external threads of the nozzle body such that the static charge ring is connected to the nozzle body;
wherein the spacer is received within the fourth internal passageway of the static charge ring such that at least a portion of the spacer is positioned axially between the outlet end portion of the nozzle body and the outlet end portion of the static charge ring; and
wherein the internal threads of the nozzle tip threadably engage the external threads of the static charge ring such that the nozzle tip is connected to the static charge ring.

2. The electrostatic sprayer of claim 1, further comprising:
a hose adapted to be connected to the spray gun to communicate the pressurized spray media and the pressurized air to the spray gun; and
a main unit to which the hose is further adapted to be connected to communicate the pressurized spray media and the pressurized air to the spray gun.

3. The electrostatic sprayer of claim 2, wherein:
the spray gun further comprises an input device actuable by a user;
the hose is further adapted to communicate data/signal(s) from the input device to the main unit; and
a flow of the pressurized spray media communicated to the spray gun via the hose is varied based on the data/signal(s) received at the main unit from the input device.

4. The electrostatic sprayer of claim 2, wherein the main unit has:
a first power mode, in which a battery received in the main unit powers one or more components of the electrostatic sprayer; and
a second power mode, in which a power source spaced apart from the main unit powers the one or more components of the electrostatic sprayer.

5. The electrostatic sprayer of claim 4, wherein the main unit further comprises:
a connection terminal via which the battery is externally detachable from, and connectable to, the main unit to power, in the first power mode, the one or more components of the electrostatic sprayer.

6. The electrostatic sprayer of claim 2, wherein:
the spray gun further comprises a gun connector;
the main unit comprises a main connector; and
the hose comprises first and second hose connectors,
the first hose connector being or including a first quick-connect fitting adapted to be detachably connected to the gun connector, and
the second hose connector being or including a second quick-connect fitting adapted to be detachably connected to the main connector.

7. The electrostatic sprayer of claim 2, wherein:
the generator is contained in the main unit; and
the hose is further adapted to communicate electrostatic charge(s) from the generator to the spray gun.

8. The electrostatic sprayer of claim 2, wherein:
the spray gun further comprises a light and an input device;
the hose is further adapted to communicate D/C power from the main unit to the spray gun; and
the input device is adapted to receive the D/C power from the hose, and is actuable by a user to relay the D/C power to the light.

9. The electrostatic sprayer of claim 2, wherein the main unit comprises:
a container containing the spray media, the container being detachable from the main unit and including a valve adapted to close when the container is detached from the main unit, and to open when the container is connected to main unit; and
a pump to which the container is adapted to communicate the spray media, via the valve, when the container is attached to the main unit, the pump being adapted to pressurize the spray media.

10. The electrostatic sprayer of claim 1, wherein the nozzle further comprises:

a fluid electrode defining a sixth internal passageway via which the pressurized spray media is communicated to the first internal passageway at the inlet end portion of the nozzle body, and to which fluid electrode the generator communicates electrostatic charge(s) to electrostatically charge the pressurized spray media, and wherein the fluid electrode is connected to, and in contact with, the nozzle body.

* * * * *

UNITED STATES PATENT AND TRADEMARK OFFICE
CERTIFICATE OF CORRECTION

| | | |
|---|---|---|
| PATENT NO. | : 11,980,907 B2 | Page 1 of 1 |
| APPLICATION NO. | : 17/748700 | |
| DATED | : May 14, 2024 | |
| INVENTOR(S) | : Kolby Oswald et al. | |

It is certified that error appears in the above-identified patent and that said Letters Patent is hereby corrected as shown below:

In the Claims

Claim 1, Column 19, Line 51, add "tip" after -- a nozzle --

Signed and Sealed this
Twenty-second Day of April, 2025

Coke Morgan Stewart
*Acting Director of the United States Patent and Trademark Office*